United States Patent
Kim et al.

(10) Patent No.: US 10,775,916 B2
(45) Date of Patent: Sep. 15, 2020

(54) DISPLAY DEVICE INCLUDING SENSOR ELECTRODES

(71) Applicant: SAMSUNG DISPLAY CO., LTD., Yongin-si, Gyeonggi-Do (KR)

(72) Inventors: Do Ik Kim, Yongin-si (KR); Gwang Bum Ko, Yongin-si (KR); Jung Hak Kim, Yongin-si (KR); Sang Chul Lee, Yongin-si (KR); Ga Young Kim, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 29 days.

(21) Appl. No.: 16/163,116

(22) Filed: Oct. 17, 2018

(65) Prior Publication Data

US 2019/0235678 A1 Aug. 1, 2019

(30) Foreign Application Priority Data

Jan. 31, 2018 (KR) .......................... 10-2018-0012270

(51) Int. Cl.
*G06F 3/041* (2006.01)
*G06F 3/044* (2006.01)
*G09G 3/20* (2006.01)

(52) U.S. Cl.
CPC .......... *G06F 3/0412* (2013.01); *G06F 3/044* (2013.01); *G06F 3/0418* (2013.01); *G06F 3/0443* (2019.05); *G06F 3/0445* (2019.05); *G06F 3/0446* (2019.05); *G06F 3/0448* (2019.05); *G06F 3/04164* (2019.05); *G09G 3/20* (2013.01);

(Continued)

(58) Field of Classification Search
CPC .... G06F 3/0412; G06F 3/0445; G06F 3/0446; G06F 3/04164; G06F 3/0448; G06F 3/0443; G06F 3/0418; G06F 3/044; G06F 2203/04112; G09G 3/20; G09G 2310/0264
See application file for complete search history.

(56) References Cited

U.S. PATENT DOCUMENTS 8,536,880 B2    9/2013  Philipp
8,552,315 B2 *  10/2013 Yilmaz ................... G06F 3/044
                                                          178/18.06
8,736,573 B2    5/2014  Byun et al.
(Continued)

FOREIGN PATENT DOCUMENTS

KR    1020110091380    8/2011
KR    101620463        5/2016
KR    101786119        10/2017

*Primary Examiner* — Peter D McLoone
(74) *Attorney, Agent, or Firm* — F. Chau & Associates, LLC

(57) ABSTRACT

There is provided a display device including a high-sensitivity touch sensor. A display device includes: pixels arranged in a display region; sensing electrodes arranged in a sensing region; sensing lines coupled to the respective sensing electrodes; a noise detection electrode disposed on the same layer as the sensing electrodes; sensing channels each including a first input terminal coupled to any one of the sensing electrodes and a second input terminal coupled to the noise detection electrode, the sensing channels each generating an output signal corresponding to a voltage difference between the first and second input terminals; and a processor detecting a touch input, using the output signals of the sensing channels.

45 Claims, 26 Drawing Sheets

(52) U.S. Cl.
CPC ............ *G06F 2203/04112* (2013.01); *G09G 2310/0264* (2013.01)

(56) References Cited

U.S. PATENT DOCUMENTS

| | | | |
|---|---|---|---|
| 8,970,515 B2 | 3/2015 | Moran et al. | |
| 9,081,453 B2* | 7/2015 | Bulea | G06F 3/044 |
| 9,244,573 B2 | 1/2016 | Ryu et al. | |
| 9,292,138 B2* | 3/2016 | Gourevitch | G06F 3/044 |
| 10,338,747 B2* | 7/2019 | Kim | G06F 3/044 |
| 2011/0048812 A1* | 3/2011 | Yilmaz | G06F 3/044 |
| | | | 178/18.06 |
| 2011/0048813 A1* | 3/2011 | Yilmaz | G06F 3/044 |
| | | | 178/18.06 |
| 2013/0081869 A1* | 4/2013 | Kim | G06F 3/044 |
| | | | 174/261 |
| 2013/0257785 A1* | 10/2013 | Brown | G06F 3/044 |
| | | | 345/174 |
| 2013/0257786 A1* | 10/2013 | Brown | G06F 3/044 |
| | | | 345/174 |
| 2014/0232682 A1* | 8/2014 | Kim | G06F 3/044 |
| | | | 345/174 |
| 2015/0103048 A1* | 4/2015 | Nakayama | G06F 3/044 |
| | | | 345/174 |
| 2015/0193081 A1* | 7/2015 | Liu | G06F 3/0418 |
| | | | 345/174 |
| 2016/0378265 A1* | 12/2016 | Katsurahira | G06F 3/0418 |
| | | | 345/174 |
| 2017/0286740 A1* | 10/2017 | Liu | G06F 3/044 |
| 2018/0321793 A1* | 11/2018 | Kim | G06F 3/0418 |
| 2018/0329555 A1* | 11/2018 | Kim | G09G 3/3208 |
| 2019/0332212 A1* | 10/2019 | Kim | G06F 3/0412 |

\* cited by examiner

DISPLAY DEVICE INCLUDING SENSOR ELECTRODES

CROSS-REFERENCE TO RELATED APPLICATION

The present application claims priority under 35 U.S.C. § 119(a) to Korean patent application 10-2018-0012270 filed on Jan. 31, 2018 in the Korean Intellectual Property Office, the entire disclosure of which is incorporated by reference.

TECHNICAL FIELD

An aspect of the present disclosure relates to a display device, and more particularly, to a display device including a touch sensor.

DISCUSSION OF THE RELATED ART

Touch screen display devices including touch sensors have been widely used to provide a convenient input means. For example, a touch sensor is attached to one surface of a display device or is integrally manufactured with the display panel, to sense a touch input. Touch screen display mobile devices facilitates an input interface without additional hardware or accessory.

SUMMARY

Embodiments provide a display device including a high-sensitivity touch sensor.

According to an aspect of the present disclosure, there is provided a display device including: pixels arranged in a display region; sensing electrodes arranged in a sensing region; sensing lines coupled to the respective sensing electrodes; a noise detection electrode disposed on the same layer as the sensing electrodes; sensing channels each including a first input terminal coupled to any one of the sensing electrodes and a second input terminal coupled to the noise detection electrode, the sensing channels each generating an output signal corresponding to a voltage difference between the first and second input terminals; and a processor detecting a touch input, using the output signals of the sensing channels.

The sensing lines may be disposed on the same layer as the sensing electrodes and the noise detection electrode.

Each of the sensing lines may be integrally coupled to any one of the sensing electrodes in a sensor in which the sensing electrodes are arranged.

The display device may further include: driving electrodes arranged in the sensing region, the driving electrodes being disposed on the same layer as the sensing electrodes and the noise detection electrode; and driving lines coupled to the driving electrodes.

Each of the driving lines may be integrally coupled to any one of the driving electrodes in the sensor in which the driving electrodes and the sensing electrodes are arranged.

Each of the sensing electrodes may extend along a first direction in the sensing region. Each of the driving electrodes may be configured with a plurality of division electrodes distributed in the sensing region, corresponding to predetermined coordinate points along the first direction and a second direction intersecting the first direction.

The noise detection electrode may include: a first electrode part disposed at the outside of the sensing region; and a second electrode part extending to the inside of the sensing region from the first electrode part.

The second electrode part may extend along the first direction, to be disposed in parallel to at least one sensing electrode among the sensing electrodes.

Each of the sensing electrodes may include an opening disposed at the inside thereof. The second electrode part of the noise detection electrode may branch off into a plurality of parts from the first electrode part to be located in the opening of each of the sensing electrodes.

The driving lines may have a stepped shape in the number corresponding to the position of a corresponding driving electrode.

The second electrode part of the noise detection electrode may be disposed in the vicinity of the driving lines while having a stepped shape corresponding to that of the driving lines.

The second electrode part may have a fine line structure, a mesh structure, a plate-type structure, or a complex structure in which at least two structures among the structures are combined.

The display device may further include dummy patterns disposed in the vicinity of the driving lines while having a length gradually changed corresponding to the stepped shape of the driving lines.

The second electrode part of the noise detection electrode may be disposed in parallel to the dummy patterns to be disposed adjacent to the dummy patterns.

Each of the sensing electrodes may include at least one opening disposed at the inside thereof. The noise detection electrode may further include a third electrode part disposed in the opening of each of the sensing electrodes.

The display device may further include an amplifying circuit coupled between the noise detection electrode and the sensing channels.

A gain value of the amplifying circuit may be changed for every at least one sub-period among a plurality of sub-periods in which each of the driving electrodes is driven.

Each of the driving electrodes may extend along a first direction in the sensing region. Each of the sensing electrodes may be configured with a plurality of division electrodes distributed in the sensing region, corresponding to predetermined coordinate points along the first direction and a second direction intersecting the first direction.

The noise detection electrode may include: a first electrode part disposed at the outside of the sensing region; and a second electrode part extending to the inside of the sensing region from the first electrode part.

The sensing lines may have a stepped shape in the number corresponding to the position of a corresponding sensing electrode. The second electrode part of the noise detection electrode may be disposed in the vicinity of the sensing lines while having a stepped shape corresponding to that of the sensing lines.

The second electrode part may have a mesh structure, a plate-type structure, or a complex structure in which the mesh structure and the plate-type structure are combined.

The display device may further include dummy patterns disposed in the vicinity of the sensing lines while having a length gradually changed corresponding to the stepped shape of the sensing lines.

The second electrode part of the noise detection electrode may be configured with at least one fine line disposed in parallel to the dummy patterns.

The display device may further include an amplifying circuit coupled between the noise detection electrode and the sensing channels.

The amplifying circuit may include: a gain amplifier coupled between the noise detection electrode and the sensing channels; and a plurality of resistors coupled in parallel to an output terminal of the gain amplifier, the plurality of resistors being coupled to different sensing channels among the sensing channels.

The sensing region may be divided into a plurality of sub-regions along at least one of first and second directions intersecting each other. The sensing electrodes may be divided and disposed in different sub-regions, and each of the sensing electrodes may be configured with a plurality of first division electrodes distributed in a corresponding sub-region.

Each of the driving electrodes may be configured to a plurality of second division electrodes, of which at least one is disposed in each of the sub-regions.

The noise detection electrode may include: a first electrode part disposed at the outside of the sensing region; and a second electrode part extending to the inside of the sensing region from the first electrode part.

The second electrode part may pass through a region between adjacent first division electrodes among the first division electrodes.

The second electrode part may be disposed between adjacent first and second division electrodes, and have a fine line structure, a mesh structure, a plate-type structure, or a complex structure in which at least two structures among the structures are combined.

The display device may further include dummy patterns disposed between at least one of the driving electrodes and the second electrode part.

Each of the sensing electrodes may include at least one opening disposed at the inside thereof. The noise detection electrode may further include a third electrode part disposed in the opening of each of the sensing electrodes.

The display device may further include an amplifying circuit coupled between the noise detection electrode and the sensing channels.

The amplifying circuit may include: a gain amplifier coupled between the noise detection electrode and the sensing channels; and a plurality of resistors coupled in parallel to an output terminal of the gain amplifier, the plurality of resistors being coupled to at least one sensing channel among the sensing channels.

A gain value of the amplifying circuit may be changed for every at least one sub-period among a plurality of sub-periods in which each of the driving electrodes is driven.

The sensing electrodes may be distributed at respective coordinate points along first and second directions intersecting each other, and be coupled to different sensing channels among the sensing channels.

The noise detection electrode may include: a first electrode part disposed at the outside of the sensing region; and a second electrode part extending to the inside of the sensing region from the first electrode part to pass between adjacent sensing electrodes.

The second electrode part may have a fine line structure, a mesh structure, a plate-type structure, or a complex structure in which at least two structures among the structures are combined.

The display device may further include dummy patterns disposed between the second electrode part and the sensing electrodes.

Each of the sensing electrodes may include at least one opening disposed at the inside thereof. The noise detection electrode may further include a third electrode part disposed in the opening of each of the sensing electrodes.

The display device may further include an amplifying circuit coupled between the noise detection electrode and the sensing channels.

The amplifying circuit may include: a gain amplifier coupled between the noise detection electrode and the sensing channels; and a plurality of resistors coupled in parallel to an output terminal of the gain amplifier, the plurality of resistors being coupled to at least one sensing channel among the sensing channels.

Among the sensing channels, a plurality of sensing channels corresponding to sensing electrodes disposed on the same row of the sensing region may be commonly coupled to any one of the resistors of the amplifying circuit.

The sensing region may overlap with the display region.

According to an aspect of the present disclosure, there is provided a display device including: pixels arranged in a display region; sensor electrodes distributed in a sensing region; sensor lines coupled to the respective sensor electrodes; a noise detection electrode disposed at the periphery of the sensor electrodes; dummy patterns disposed between the sensor electrodes and the noise detection electrode; sensing channels each including a first input terminal coupled to at least one of the sensor electrodes and a second input terminal coupled to the noise detection electrode, the sensing channels each generating an output signal corresponding to a voltage difference between the first and second input terminals; and a processor detecting a touch input, using the output signals of the sensing channels.

The sensor lines may have a stepped shape in the number corresponding to the position of each sensor electrode. The dummy patterns may be disposed in the vicinity of the sensor lines while having a length gradually changed corresponding to the stepped shape of the sensor lines.

The noise detection electrode may include: a first electrode part disposed at the outside of the sensing region; and a second electrode part extending to the inside of the sensing region from the first electrode part, the second electrode part having a stepped shape corresponding to that of the sensor lines.

The sensor electrodes, the sensor lines, and the noise detection electrode may be disposed on the same layer.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
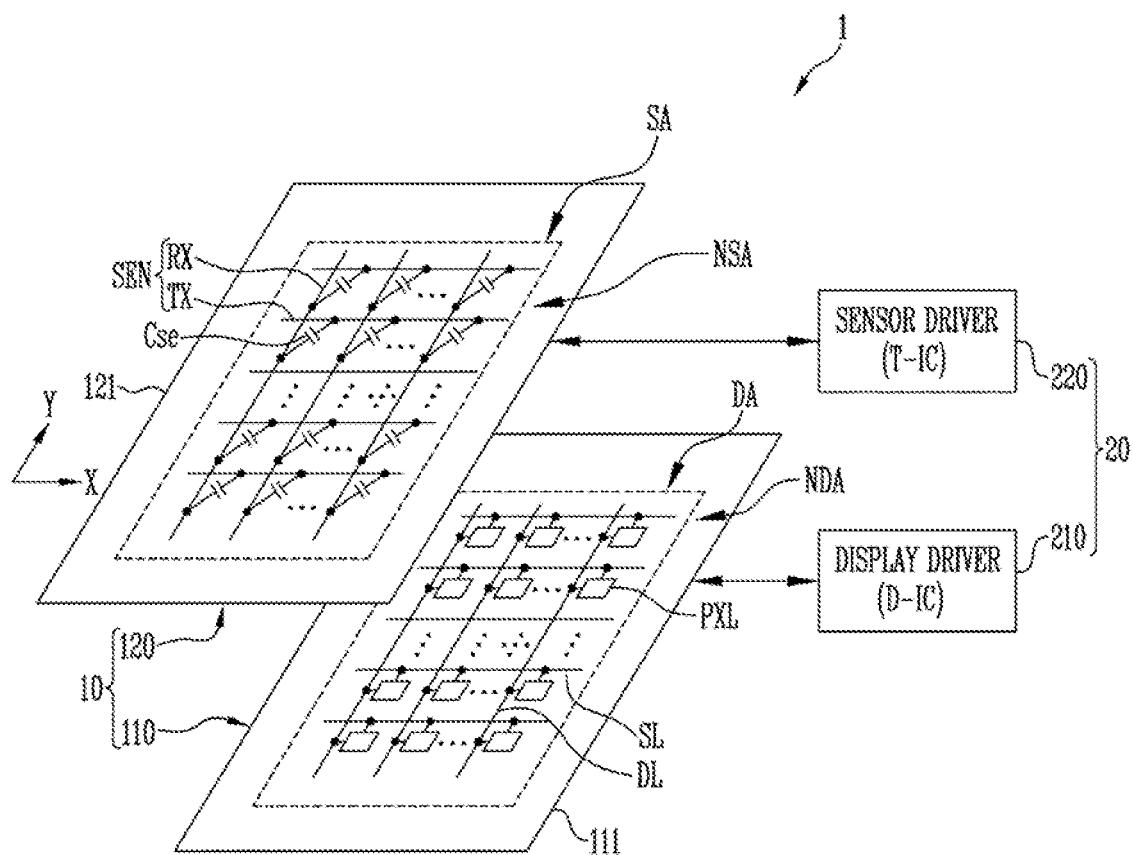
FIG. 1 illustrates a display device according to an embodiment of the present disclosure.

Hereinafter, exemplary embodiments of the present disclosure will be described in detail with reference to the accompanying drawings. However, the present disclosure is not limited to the embodiments but may be implemented into different forms. These embodiments are provided only for illustrative purposes and for full understanding of the scope of the present disclosure by those skilled in the art. In the entire specification, when an element is referred to as being "connected" or "coupled" to another element, it can be directly connected or coupled to the another element or be indirectly connected or coupled to the another element with one or more intervening elements interposed therebetween.

Meanwhile, in the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

FIG. 1 illustrates a display device according to an embodiment of the present disclosure. In some embodiments, as shown in FIG. 1, the display device 1 includes a touch sensor that uses a mutual capacitance method, but the kind of touch sensor that may be used in the display device 1 is not limited the particular method as shown.

Referring to FIG. 1, the display device 1 according to an embodiment of the present disclosure includes a panel unit 10 and a driving circuit 20 for driving the panel unit 10. In some embodiments, the panel unit 10 includes a display 110 (e.g., a display panel) for displaying an image and a sensor 120 (e.g., a touch screen or a touch sensing device) for sensing a touch input. Meanwhile, the driving circuit 20 includes a display driver 210 for driving the display 110 and a sensor driver 220 for driving the sensor 120. In the display device 1, the display 110 and the display driver 210 may constitute a display unit, and the sensor 120 and the sensor driver 220 may constitute a sensing unit (e.g., a touch sensor).

In some embodiments, after the display 110 and the sensor 120 are manufactured separately from each other, the display 110 and the sensor 120 may be disposed and/or coupled such that at least one region of the display 110 overlaps with at least one region of the sensor 120. In another embodiment, the display 110 and the sensor 120 may be integrally manufactured. In one example, the sensor 120 may be directly formed on at least one substrate, such as, an upper substrate and/or a lower substrate of the display panel or a thin film encapsulation layer (TFE). In another example, the sensor 120 may be directly formed on another insulating layer of the display panel or one of various functional layers, such as, an optical layer or a protective layer.

In the embodiment as shown in FIG. 1, the sensor 120 is disposed at a front surface (an upper surface on which an image is displayed) of the display 110. In other embodiments, the sensor 120 may be disposed at a surface other than the front surface. For example, the sensor 120 may be disposed at a back surface or both sides of the display 110. In still another embodiment, the sensor 120 may be disposed in at least one edge region of the display 110.

The display 110 includes a display substrate 111 and a plurality of pixels PXL formed on the display substrate 111. The pixels PXL may be arranged in a display region DA on the display substrate 111.

The display substrate 111 includes the display region DA in which an image is displayed and a non-display region NDA located at the periphery of the display region DA. In some embodiments, the display region DA may be located in a central region of the display 110, and the non-display region NDA may be located at an edge region of the display 110 in the periphery that surrounds the display region DA.

The display substrate 111 may be a rigid substrate or a flexible substrate, and the material or property of the display substrate 111 is not particularly limited. For example, the display substrate 111 may be a rigid substrate configured with glass or tempered glass, or a flexible substrate configured with a thin film made of plastic or metal.

In the display region DA, there are scan lines SL, data lines DL, and pixels PXL that are coupled to the scan lines SL and the data lines DL. In some embodiments, the scan lines SL and the data lines DL may extend outside the display region DA. When some of the pixels PXL are selected by a scan signal supplied from the scan lines SL to create selected pixels, a selected pixel may be supplied with a data signal from the data lines DL, for making such selected pixel to emit light with a luminance corresponding to the data signal. When the pixels PXL are supplied their data signals, an image corresponding to the data signals is displayed in the display region DA. In the present disclosure, the structure and the driving method of the pixels PXL are not particularly limited. For example, the pixels PXL may be implemented with various structures and/or may be driving with various driving methods. As an example, each of the pixels PXL may be a self-luminescence type pixel that includes at least one organic light emitting diode OLED, but the present disclosure is not limited thereto.

Various lines coupled to the pixels PXL of the display region DA and/or a built-in circuit may be disposed in the non-display region NDA. As an example, a plurality of lines for supplying various driving power sources and driving signals to the pixels PXL in the display region DA may be disposed in the non-display region NDA. In addition, a scan driving circuit, etc. may be further disposed in the non-display region NDA to supply scan signals to the scan lines SL.

In the present disclosure, the kind of display 110 is not particularly limited. For example, the display 110 may be implemented with a self-luminescence type display panel such as an organic light emitting display panel (OLED panel). Alternatively, the display 110 may be implemented with a non-luminescence type display panel such as a liquid crystal display panel (LCD panel). When the display 110 is implemented with the non-luminescence type display panel, the display device 1 may additionally include a light source such as a back-light unit (BLU).

The sensor 120 includes a sensor substrate 121 and a plurality of sensor electrodes SEN formed on the sensor substrate 121. The sensor electrodes SEN may be disposed in a sensing region SA on the sensor substrate 121.

The sensor substrate 121 includes the sensing region SA in which a touch input is sensed and a peripheral region NSA surrounding the sensing region SA. In some embodiments, the sensing region SA may be disposed to overlap with at least one region of the display region DA. As an example, the sensing region SA may be set as a region corresponding to the display region DA (e.g., a region overlapping with the display region DA), and the peripheral region NSA may be set as a region corresponding to the non-display region NDA (e.g., a region overlapping with the non-display region NDA). In this case, when a touch input is provided in the display region DA, the touch input may be detected through the sensor 120.

The sensor substrate 121 may be a rigid substrate or a flexible substrate. In addition, the sensor substrate 121 may be configured with at least one insulating layer. Also, the sensor substrate 121 may be a transparent or translucent light transmission substrate, but the present disclosure is not limited thereto. For example, the sensor substrate 121 may be a rigid substrate configured with glass or tempered glass, or a flexible substrate configured with a thin film made of plastic or metal. In some embodiments, at least one of the substrates that constitute the display 110 (e.g., the display substrate 111, an encapsulation substrate and/or a thin film encapsulation layer) may be used as the sensor substrate 121. In some embodiments, at least one insulating layer or functional layer disposed inside of the display 110 and/or disposed at an outer surface of the display 110 may be used as the sensor substrate 121.

The sensing region SA is an active region of the touch sensor, which is a region capable of reacting with a touch input. The sensor electrodes SEN for sensing a touch input may be arranged in the sensing region SA. In some embodiments, the sensor electrodes SEN may include driving electrodes TX and sensing electrodes RX. A touch sensor using a mutual capacitance method may be implemented with the driving electrodes TX and the sensing electrodes RX. In this disclosure, a driving electrode may be characterized as a first driving electrode, and a sensing electrode may be characterized as a second driving electrode.

In some embodiments, each of the driving electrodes TX and the sensing electrodes RX, which is conductive, may include at least one of a metallic material, a transparent conductive material, and various conductive materials. As an example, each of the driving electrodes TX and the sensing electrodes RX may include at least one of various metallic materials including gold (Au), silver (Ag), aluminum (Al), molybdenum (Mo), chromium (Cr), titanium (Ti), nickel (Ni), neodymium (Nd), copper (Cu), platinum (Pt), and the like, or any alloy thereof. Also, each of the driving electrodes TX and the sensing electrodes RX may include at least one of various transparent conductive materials including silver nano wire (AgNW), indium tin oxide (ITO), indium zinc oxide (IZO), antimony zinc oxide (AZO), indium tin zinc oxide (ITZO), zinc oxide (ZnO), tin oxide ($SiO_2$), carbon nano tube, graphene, and the like. In addition, each of the driving electrodes TX and the sensing electrodes RX may include at least one of various conductive materials. Also, each of the driving electrodes TX and the sensing electrodes RX may be provided in a single layer or multi-layer, and its sectional structure is not particularly limited.

In an embodiment of the present disclosure, the driving electrodes TX and the sensing electrodes RX may extend and/or be coupled along different directions. As an example, the driving electrodes TX may extend along an X direction in the sensing region SA, and the sensing electrodes RX may extend along a Y direction in the sensing region SA to intersect with the driving electrodes TX. Alternatively, in another embodiment, the driving electrodes TX may extend along the Y direction, and the sensing electrode RX may extend along the X direction. The driving electrodes TX and the sensing electrodes RX may be spaced apart from each other. As an example, when the driving electrodes TX and the sensing electrodes RX intersect each other, at least one insulating layer (or insulating pattern) or a separation space may be located between the driving electrodes TX and the sensing electrodes RX (which covers at least an intersection portion).

Also, in another embodiment, the driving electrodes TX and the sensing electrodes RX may be distributed on the same layer of the sensing region SA not to intersect each other. In this case, it is unnecessary to dispose any interlayer insulating layer between the driving electrodes TX and the sensing electrodes RX, and the driving electrodes TX and the sensing electrodes RX can be simultaneously patterned through a single mask process. If the driving electrodes TX and the sensing electrodes RX are disposed on the same layer, the mask process is minimized, so that the manufacturing cost of the touch sensor and the display device 1 including the same can be reduced. In addition, the thickness of the touch sensor and the display device 1 can be minimized.

In the embodiment as shown in FIG. 1, a mutual capacitance Cse is formed between the driving electrodes TX and the sensing electrodes RX. The value of the capacitance Cse depends on a touch input that occurs at a corresponding point or in the vicinity thereof. Thus, a touch input can be detected by sensing a change in the value of the capacitance Cse.

Meanwhile, sensor lines (e.g., driving lines and sensing lines) for electrically coupling the sensor electrodes SEN to the sensor driver 220 may be disposed in the peripheral region NSA of the sensor 120. As an example, a plurality of driving lines coupled to the respective driving electrodes TX and a plurality of sensing lines coupled to the respective sensing electrodes RX may be disposed in the peripheral region NSA.

In at least one embodiment, the driving circuit 20 includes the display driver 210 for driving the display 110 and the sensor driver 220 for driving the sensor 120. In some embodiments, the display driver 210 and the sensor driver 220 may be configured separately from each other. In still other embodiments, at least portions of the display driver 210 and the sensor driver 220 may be integrated together in one driver IC.

The display driver 210 is electrically coupled to the display 110 to drive the pixels PXL. For example, the display driver 210 may include a scan driver for supplying a scan signal to the scan lines SL, a data driver for supplying a data signal to the data lines DL, and a timing controller for controlling the scan driver and the data driver. In some embodiments, the scan driver, the data driver, and/or the timing controller may be integrated in one display IC (D-IC), but the present disclosure is not limited thereto. For example, in another embodiment, the scan driver, the data driver, and/or the timing controller may be built in the display 110.

The sensor driver 220 is electrically coupled to the sensor 120 to drive the sensor 120. As an example, the sensor driver 220 may receive a sensing signal corresponding to a touch driving signal from the sensing electrodes RX while supplying the touch driving signal to the driving electrodes TX during a period (e.g., a touch sensing period) in which a touch sensor is activated. The sensor driver 220 may include a touch driving circuit and a touch sensing circuit. In some embodiments, the touch driving circuit and the touch sensing circuit may be integrated in one touch IC (T-IC), but the present disclosure is not limited thereto. For example, in still another embodiment, the touch driving circuit and the touch sensing circuit may be built in the sensor 120.

In some embodiments, the touch driving circuit is electrically coupled to the driving electrodes TX, to supply a touch driving signal to the driving electrodes TX. As an example, the touch driving circuit may sequentially supply the touch driving signal to one individual driving electrode a time among the driving electrodes TX. Meanwhile, the touch sensing circuit is electrically coupled to the sensing electrodes RX, to receive a sensing signal from each of the sensing electrodes RX. The touch sensing circuit detects a touch input, using the sensing signal.

The display device 1 includes a touch sensor, so that it is possible to provide convenience of use. For example, a user can easily control the display device 1 by touching a screen while viewing an image displayed in the display region DA.

Figure 2:
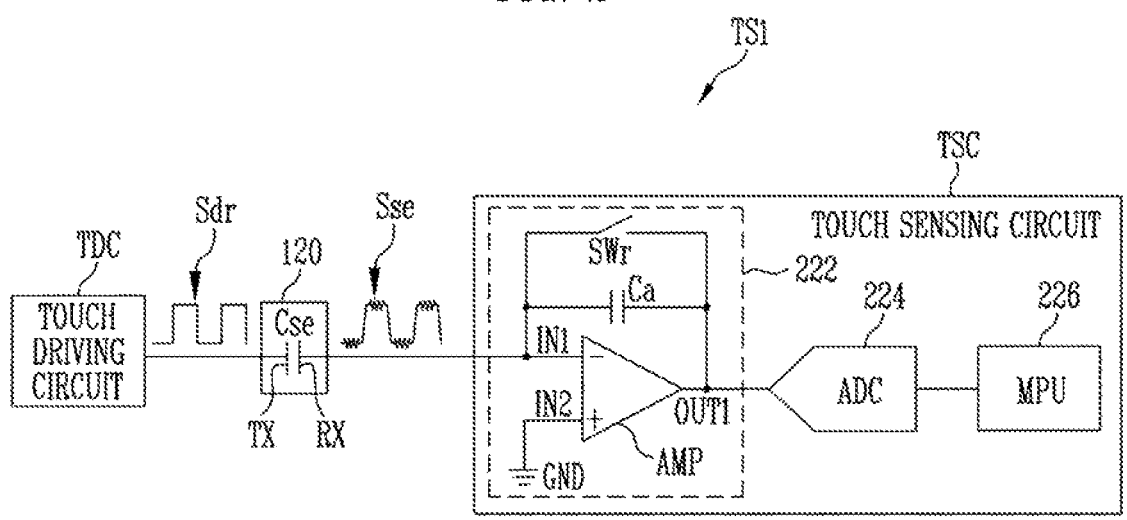
FIG. 2 illustrates a touch sensor according to an embodiment of the present disclosure.

FIG. 2 illustrates a touch sensor according to an embodiment of the present disclosure. For convenience, in FIG. 2, the configuration of the sensor 120 and the sensor driver 220 with respect to one channel of the touch sensor TS1 is illustrated.

Referring to FIG. 2, the touch sensor TS1 according to one embodiment of the present disclosure includes a pair of driving and sensing electrodes TX and RX, which forms a mutual capacitance Cse. The driving electrode TX and the sensing electrode RX are electrically coupled to a touch driving circuit TDC and a touch sensing circuit TSC, respectively.

In the following, a method of driving the touch sensor TS1 as shown in FIG. 2 is described according to one embodiment of the present disclosure. A touch driving signal Sdr is supplied from the touch driving circuit TDC to each driving electrode TX during a touch sensing period in which a touch sensing mode is activated. In some embodiments, the touch driving signal Sdr may be an AC signal having a predetermined period, such as a square wave with a predetermined duty cycle.

Meanwhile, when the sensor 120 includes a plurality of driving electrodes TX as shown in FIG. 1, the touch driving circuit TDC may sequentially supply the touch driving signal Sdr to one individual driving electrode a time among the driving electrodes TX during each predetermined touch sensing period. Then, because of a mutual capacitance Cse formed by each driving electrode TX and sensing electrodes RX in the vicinity thereof, a sensing signal Sse is induced by the touch driving signal Sdr applied to the driving electrode TX connecting to the mutual capacitance Cse as shown in FIG. 2, and this induced sensing signal Sse is output to the sensing electrodes RX connecting to the mutual capacitance Cse as shown in FIG. 2. The sensing signal Sse is input to the touch sensing circuit TSC to be used in the detection of a touch input.

In some embodiments, when the sensor 120 includes a plurality of sensing electrodes RX as shown in FIG. 1, the touch sensing circuit TSC may include a plurality of sensing channels (or receiving channels) 222 each electrically coupled to one respective sensing electrodes RX. The touch sensing circuit TSC receives each sensing signals Sse from a corresponding one of the sensing electrodes RX through one of the sensing channels 222, and detects a touch input by synthesizing the multiple sensing signals Sse received in multiple sensing channels 222.

Meanwhile, in some embodiments, each sensing electrode RX along with an amplifier AMP (or analog front end (AFE) having the amplifier AMP) coupled to the sensing electrode may constitute each sensing channel 222. However, hereinafter, the sensing electrodes RX provided in the sensor 120 and the sensing channels 222 constituting a signal receiver of the touch sensing circuit TSC will be described to be distinguished from each other for convenience of description.

The touch sensing circuit TSC amplifies, converts, and signal-processes a sensing signal Sse input from each sensing electrode RX, and detects a touch input, based on the result. To this end, the touch sensing circuit TSC may include each sensing channel 222 corresponding to each sensing electrode RX, and an analog-to-digital converter (ADC) 224 and a processor 226, which are coupled to the sensing channel 222.

In some embodiments, each sensing channel 222 may be configured with an AFE that receives a sensing signal Sse from a sensing electrode RX corresponding thereto. As an example, each sensing channel 222 may be implemented with an AFE including at least one amplifier AMP such as an operational amplifier (OP AMP).

In some embodiments, the sensing channel 222 includes a first input terminal IN1 (e.g., an inverting input terminal of the amplifier AMP) and a second input terminal IN2 (e.g., a non-inverting input terminal of the amplifier AMP), and may generate an output signal corresponding to a voltage difference between the first and second input terminals IN1 and IN2. For example, the sensing channel 222 may amplify (i.e., differentially amplify) and output a difference voltage between the first and second input terminal IN1 and N2 with a corresponding predetermined gain.

In some embodiments, when a plurality of sensing electrodes RX and a plurality of sensing channels 222 corresponding thereto are provided, each of the first input terminals IN1 of the sensing channels 222 may be coupled to one of different sensing electrodes RX. For example, the sensing electrodes RX as shown in FIG. 2 and the sensing channels 222 as shown in FIG. 2 may be coupled one-to-one. In this case, a sensing signal Sse from any one of the sensing electrodes RX may be input to the first input terminal of each of the sensing channels 222.

The second input terminal IN2 of each of the sensing channel 222 may be a reference potential terminal. As an example, the second input terminal IN2 may be coupled to a reference voltage source such as a ground power source GND. Accordingly, the sensing channel 222 amplifies and outputs a sensing signal Sse input to the first input terminal IN1, with reference to a potential of the second input terminal IN2. That is, each sensing channel 222 receives a sensing signal Sse from a corresponding sensing electrode RX through the first input terminal IN1, and amplifies and outputs a signal (difference voltage) that is proportional to a difference in voltage between the first input terminal IN1 and the second input terminal IN2, which achieves an amplification of the sensing signal Sse.

In some embodiments, the amplifier AMP may be implemented with an integrator. In this case, a capacitive element Ca and a reset switch SWr may be coupled in parallel to each other between the first input terminal IN1 and an output terminal OUT1 of the amplifier AMP.

The ADC 224 converts an analog signal input from each sensing channel 222 into a digital signal. In some embodiments, the number of the ADCs 224 may match the number of sensing electrodes RX to create a one-to-one correspondence between the sensing channels 222 and the respective sensing electrodes RX. Alternatively, in another embodiment, at least two sensing channels 222 may share one ADC 224. In this case, a switch for channel selection may be additionally provided between the sensing channels 222 and the ADC 224.

The processor 226 detects a touch input, using a sensing signal Sse output from each sensing electrode RX. For example, the processor 226 receives input from each of a plurality of sensing electrodes RX via a corresponding sensing channel 222 and a corresponding ADC 224 to generate a sensing signal Sse (i.e., an amplified and digital-converted sensing signal Sse), signal-processes the sensing signal Sse in a predetermined form that can be analyzed, and synthetically analyze the sensing signals Sse output from the respective sensing electrodes RX, for detecting whether a touch input has occurred and a position of the touch input.

In some embodiments, the processor 226 may be implemented with a microprocessor (MPU), and a memory required to drive the processor 226 may be additionally provided in the touch sensing circuit TSC. In another embodiment, the processor 226 may be implemented with a microcontroller (MCU), which in some implementations may have embedded memories.

Meanwhile, as described above, the touch sensor TS1 may be coupled to the display 110, etc. As an example, the sensor 120 may be integrally manufactured with the display 110, or be attached onto at least one surface of the display 110 after the sensor 120 and the display 110 are manufactured separately from each other. The display 110 and the sensor 120 may be disposed adjacent to each other. For example, in some embodiments, the display 110 and the sensor 120 may be disposed at a close distance and be positioned to at least partially overlap with each other.

When the display 110 and the sensor 120 are disposed adjacent to each other, in some configurations, a parasitic capacitance that is large enough to have influence on the sensitivity of the touch sensor TS1 may be formed between the display 110 and the sensor 120. As an example, some of the driving electrodes TX and the sensing electrodes RX of the sensor 120 may be adjacent to a cathode electrode or a common electrode configured in the display 110 and overlap with the cathode electrode and/or the common electrode, which may form a relatively large parasitic capacitance between the display 110 and the sensor 120. Due to the coupling of the parasitic capacitance, a display noise caused by display driving signals applied to the display 110 may be transferred to the sensor 120.

As an example, in the display device 1 according to an embodiment of the present disclosure, the display 110 may be an organic light emitting display panel including a thin film encapsulation layer, and the sensor 120 may be configured with on-cell type sensor electrodes SEN in which driving electrode TX and sensing electrodes RX are directly formed on one surface (e.g., an upper surface) of the thin film encapsulation layer. In this case, at least one electrode (e.g., a cathode electrode) provided in the display 110 and the sensor electrodes SEN are located adjacent to each other. Accordingly, noise (e.g., a common mode noise) caused by driving of the display 110 is introduced into the sensor 120. Therefore, the sensitivity of the touch sensor tS1 may be deteriorated.

Specifically, the noise transferred to the sensor 120 causes ripples in sensing signals Sse. Because of such ripples, the touch sensitivity of the touch sensor TS1 may be deteriorated as the signal-to-noise ratio (SNR) of the touch sensor TS1 decreases. Accordingly, exemplary embodiments of touch sensors and displays as described in the present disclosure minimizes malfunction of the touch sensor TS and enhances the sensitivity of a touch input.

Figure 3:
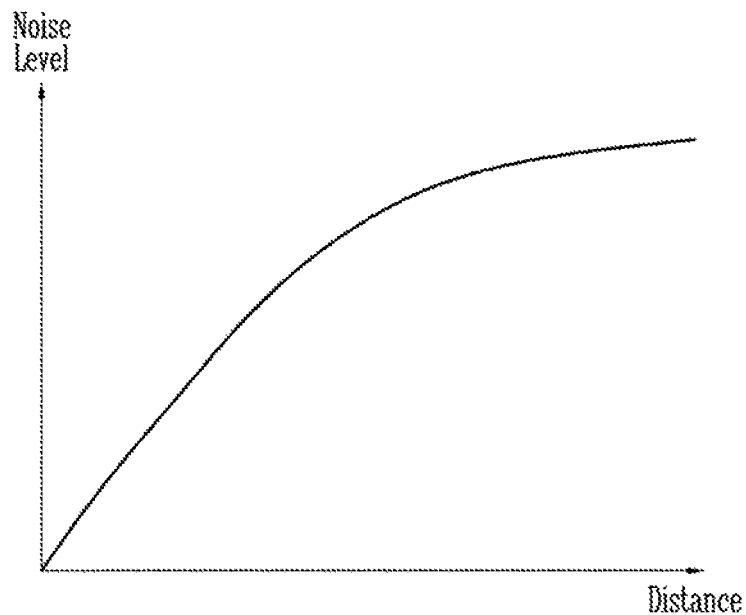
FIG. 3 illustrates noise levels transferred to a sensor of the touch sensor according to an embodiment of the present disclosure.

FIG. 3 illustrates noise levels transferred to the sensor of the touch sensor according to an embodiment of the present disclosure. Specifically, FIG. 3 illustrates changes in the level of noise with respect to distances from a pad. Different levels of noise may be presence at different positions of the sensor 120.

For example, even in the same sensor 120, the level of noise (e.g., the noise voltage) may be gradually increased as approaching from a region (e.g., a lower region) adjacent to a pad of the display 110 and/or the sensor 120 to a region (e.g., an upper region) distant from the pad. It would be more effective in removing a noise introduced into the sensor 120 when noise levels with respect to positions in the sensor 120 are considered.

Figure 4:
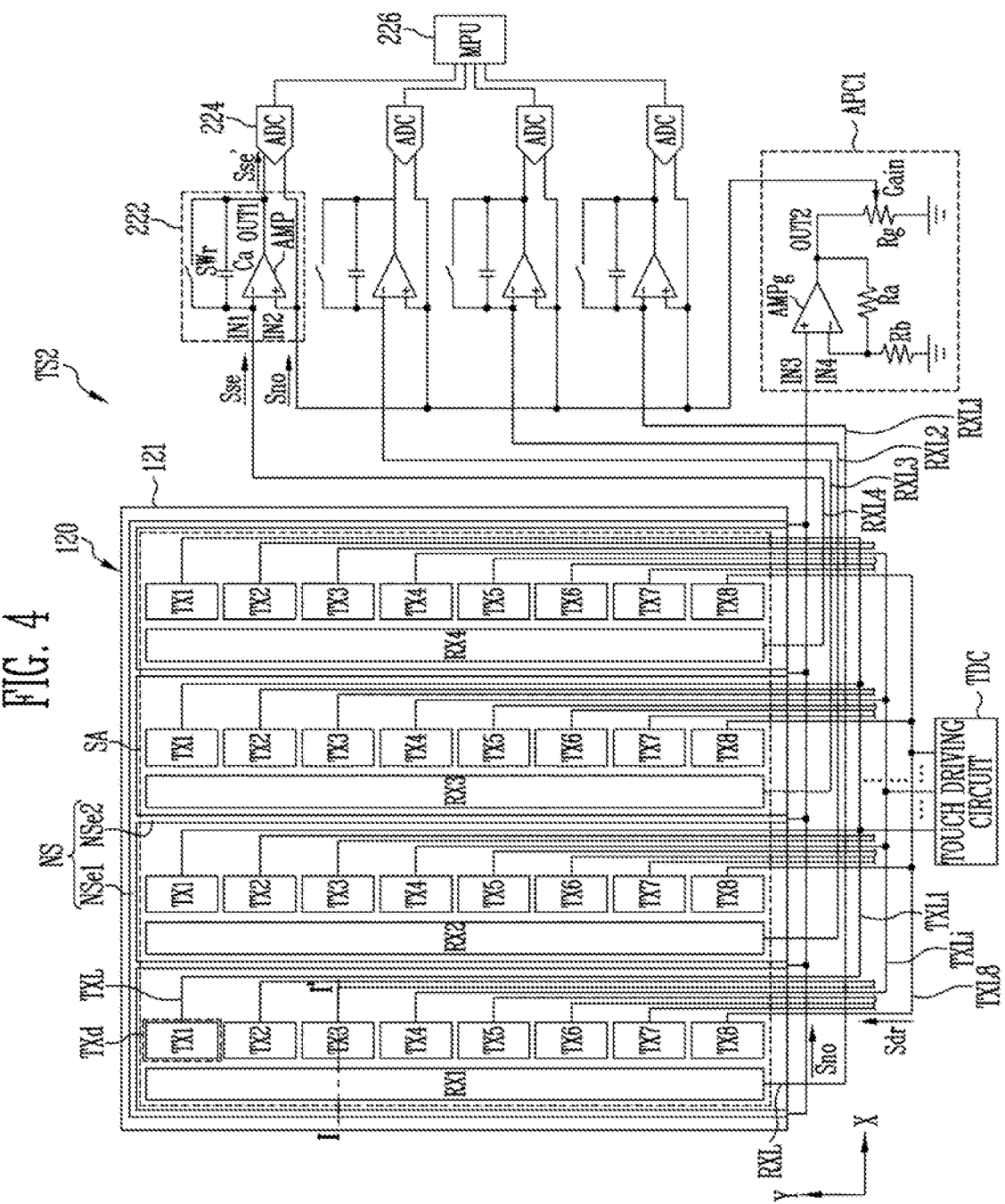
FIG. 4 illustrates a touch sensor according to an embodiment of the present disclosure.
Figure 5:
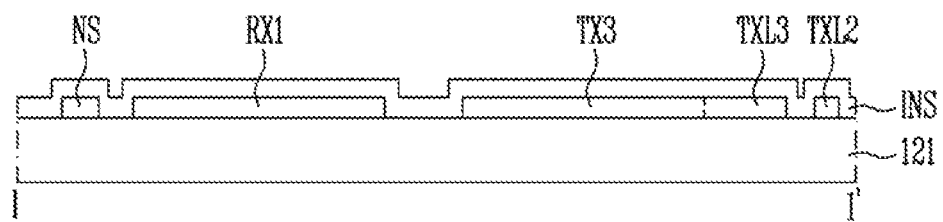
FIG. 5 illustrates an example of a section taken along line I-I' of FIG. 4.

FIG. 4 illustrates a touch sensor according to an embodiment of the present disclosure. FIG. 5 illustrates an example of a section taken along line I-I' of FIG. 4. The touch sensor TS2 shown in FIGS. 4 and 5 may be configured in, for example, the display device 1, but the present disclosure is not limited thereto and the touch sensor TS2 of FIGS. 4 and 5 may be configured in various other electronic devices. In FIGS. 4 and 5, components similar or identical to those of the embodiments of FIGS. 1 and 2 are designated by like reference numerals, and their detailed descriptions will be omitted.

Referring to FIGS. 4 and 5, in some embodiments, the touch sensor TS2 includes a plurality of driving electrodes TX1 to TX8 and a plurality of sensing electrodes RX1 to RX4, which are distributed in a sensor 120; the touch sensor TS2 also includes a plurality of driving lines (or first sensor lines) TXL1 to TXL8 and a plurality of sensing lines (or second sensor lines) RXL1 to RXL4, which are respectively coupled to the driving electrodes TX1 to TX8 and the sensing electrodes RX1 to RX4. In some embodiments, the driving electrodes TX1 to TX8 and the sensing electrodes RX1 to RX4, which are spaced apart from each other, may be disposed on the same layer of the sensor 120.

In some embodiments, each of the sensing electrodes RX1 to RX4 may extend along a first direction (e.g., a Y direction) in a sensing region SA to be disposed on a predetermined column of the sensor 120. Each of the sensing electrodes RX1 to RX4 is coupled to any one sensing channel 222 corresponding thereto. In some embodiments, each of the sensing electrodes RX1 to RX4 may be coupled to a first input terminal IN1 of any one of sensing channels 222.

Each of the driving electrodes TX1 to TX8 may be configured with a plurality of division electrodes TXd distributed at positions corresponding to predetermined coordinate points (e.g., predetermined XY coordinate points) along a second direction (e.g., an X direction) intersecting the first direction in the sensing region SA. In addition, division electrodes TXd disposed on the same row of the sensing region SA may be electrically coupled to one another by each driving line (any one of TXL1 to TXL8) at the inside and/or the outside of the sensor 120. As an example, division electrodes TXd disposed on a first row of the sensing region SA may be coupled to one another, to constitute a first driving electrode TX1. The driving electrodes TX1 to TX8 may be coupled to the touch driving circuit TDC, to be supplied with a touch driving signal Sdr from the touch driving circuit TDC.

In some embodiments, the driving lines TXL1 to TXL8 and the sensing lines RXL1 to RXL4 may also be disposed on the same layer as the driving electrodes TX1 to TX8 and the sensing electrodes RX1 to RX4 in the sensor 120. For example, each of the driving lines TXL1 to TXL8 may be integrally coupled to a driving electrode (any one of TX1 to TX8) corresponding thereto (or any one of the division electrodes TXd constituting the driving electrode), and each of the sensing lines RXL1 to RXL4 may be integrally coupled to a sensing electrode (any one of RX1 to RX4) corresponding thereto.

In addition, the touch sensor TS2 according to this embodiment further includes a noise detection electrode NS disposed at the periphery of the sensing electrodes RX1 to RX4. In some embodiments, the noise detection electrode NS may be disposed on the same layer as the driving electrodes TX1 to TX8 and the sensing electrodes RX1 to RX4, while spaced apart from the driving electrodes TX1 to TX8 and the sensing electrodes RX1 to RX4. A noise Sno having a property (e.g., a size and/or a waveform) substantially equal or similar to that of a noise introduced into the sensing electrodes RX1 to RX4 may be detected by the noise detection electrode NS.

In some embodiments, the noise detection electrode NS may include a first electrode part Nse1 disposed at the outside of the sensing region SA and a second electrode part NSe2 that extends to the inside of the sensing region SA from the first electrode part NSe1. As an example, the first electrode part NSe1 may be disposed to surround the sensing region SA, and the second electrode part NSe2 may be disposed adjacent and in parallel to at least one sensing electrode among the sensing electrodes RX1 to RX4, with the second electrode part NSe2 extending in the same direction as the sensing electrodes RX1 to RX4 in the sensing region SA. Also, in some embodiments, the first electrode part NSe1 and the second electrode part NSe2 may be integrally coupled.

Alternatively, in another embodiment, the noise detection electrode NS may be separated into pieces which are formed at the inside of the sensor 120 and coupled together as one at the outside of the sensor 120. In such embodiment, the noise detection electrode NS may be coupled at the inside and/or the outside (e.g., a flexible circuit board coupled to the sensor 120) of the sensor 120. When the noise detection electrode NS is coupled as one, the number of lines of the sensor 120 and/or the flexible circuit board can be reduced.

In some embodiments, the noise detection electrode NS may be coupled to second input terminals IN2 of the sensing channels 222. For example, the noise detection electrode NS may be commonly coupled to the second input terminal IN2 of each of the sensing channels 222.

Meanwhile, at least one insulating layer INS may be disposed over the driving electrodes TX1 to TX8, the sensing electrodes RX1 to RX4, and the noise detection electrode NS. Accordingly, it is possible to ensure the stability of the driving electrodes TX1 to TX8, the sensing electrodes RX1 to RX4, and the noise detection electrode NS.

In the above-described embodiment, each of the sensing channels 222 includes a first input terminal IN1 that is connected to one of the sensing electrodes RX1 to RX4 and a second input terminal IN2 that is coupled to the noise detection electrode NS. In some embodiments, the second input terminal IN2 may be coupled to the noise detection electrode NS via an amplifying circuit APC1. Each of the sensing channels 222 generates an output signal corresponding to a difference in voltage between the first and second input terminals IN1 and IN2.

In operation, a noise Sno introduced into the sensor 120 is detected using the noise detection electrode SN, and a noise component included in a sensing signal Sse in each sensing channel 222 can be reduced using the detected noise Sno. Specifically, each sensing channel 222 amplifies a difference between a sensing signal Sse that is received at the first input terminal IN1 from a corresponding sensing electrode (any one of RX1 to RX4) and a noise Sno that is received at the second input terminal IN2 from the noise detection electrode NS. Accordingly, a noise component included in the sensing signal Sse can be cancelled or reduced in each of the sensing channels 222.

An output signal Sse' in an analog form, which is output from each sensing channel 222, is converted into a digital value by an ADC 224 and then is input to a processor 226, for using in the detection of a touch input. In some embodiments, the ADC 224 may convert the output signal Sse' of each sensing channel 222 into a digital value, based on the potential of the noise Sno. To this end, a reference potential terminal of the ADC 224 may be coupled to the noise detection electrode NS together with the second input terminal IN2 of the sensing channel 222. That is, in this embodiment, the reference potential of the touch sensing circuit TSC may be changed corresponding to the potential of the noise Sno. Thus, a noise component carried in the sensing signal Sse can be removed or reduced in the touch sensing circuit TSC.

In an embodiment of the present disclosure as shown in FIG. 4, the touch sensor may further include the amplifying circuit APC1 coupled between the noise detection electrode NS and the sensing channels 222. The amplifying circuit APC1 may include at least one gain amplifier AMPg.

In some embodiments, the gain amplifier AMPg may include a third input terminal IN3 coupled to the noise detection electrode NS and a fourth input terminal IN4 coupled to a predetermined reference voltage source (e.g., ground power source). Meanwhile, Ra and Rb of FIG. 4 designate input/output impedances of the gain amplifier AMPg. In some embodiments, an output terminal OUT2 of the gain amplifier AMPg may be coupled to the sensing channels 222 (particularly, each second input terminal IN2) via at least one gain resistor (or output resistor) Rg.

The above-described amplifying circuit APC1 amplifies a noise Sno input from the noise detection electrode NS with a predetermined gain value and supplies the amplified noise Sno to the sensing channels 222. In particular, the gain value of the amplifying circuit APC1 may be set such that the noise component of the sensing signal Sse can be effectively cancelled or reduced in each sensing channel 222. As an example, when assuming that the magnitude of the noise Sno is gradually increased as approaching from a lower region (e.g., a region in which an eighth driving electrode TX8 is disposed) of the sensor 120 to an upper region (e.g., a region in which a first driving electrode TX1 is disposed) of the sensor 120, the gain value of the amplifying circuit APC1 may be changed for every at least one sub-period among a plurality of sub-periods in which each driving electrode (any one of TX1 to TX8) is driven such that noise cancellation can be maximized.

Figure 6:
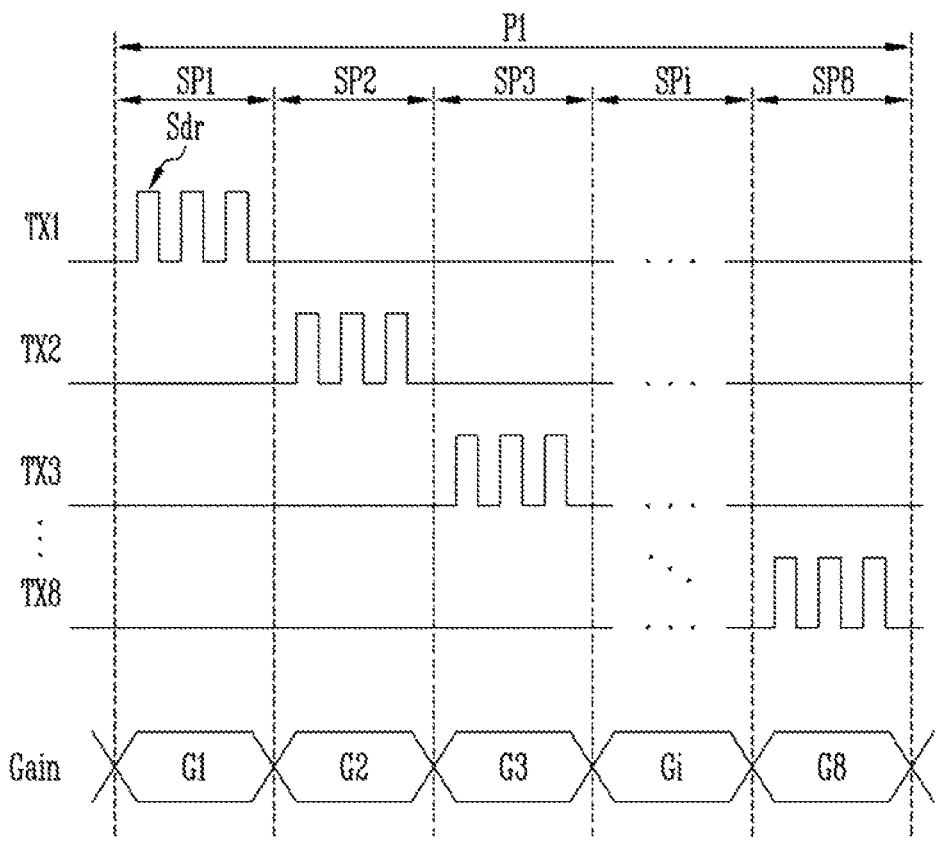
FIG. 6 illustrates an embodiment related to a noise gain control method of the touch sensor shown in FIG. 4.

FIG. 6 illustrates an embodiment related to a noise gain control method of the touch sensor shown in FIG. 4.

Referring to FIG. 6, one period P1 in which the driving electrodes TX1 to TX8 are sequentially driven may be configured with a plurality of sub-periods SP1 to SP8 in which a touch driving signal Sdr is supplied to each driving electrode (any one of TX1 to TX8). In addition, a gain value G1 to G8 of the amplifying circuit APC1 may be controlled for each sub-period (any one of the sub-periods SP1 to SP8) such that noise cancellation is maximized. As an example, during an ith (i is a natural number) sub-period SPi in which an ith driving electrode TXi is driven, the amplifying circuit APC1 may have a predetermined gain value Gi corresponding to the position of the driving electrode TXi.

Meanwhile, in the embodiment of FIG. 6, it is illustrated that the gain value G1 to G8 of the amplifying circuit APC1 is changed for each sub-period (any one of the sub-periods SP1 to SP8), but the present disclosure is not limited thereto. For example, in another embodiment of the present disclosure, the gain value G1 to G8 of the amplifying circuit APC1 may be changed in the unit of at least two sub-periods (at least two of the sub-periods SP1 to SP8).

In the touch sensor TS2 and the display device 1 including the same, according to the embodiment of FIGS. 4 to 6, a noise Sno introduced into the sensor 120 is detected using the noise detection electrode NS, and a noise component included in a sensing signal Sse can be effectively removed using the detected noise Sno. Accordingly, the touch sensor TS2 operates more reliably with enhanced sensitivity to touch input. As an example, according to the embodiment of the present disclosure, the SNR of the touch sensor TS2 can be increased even when the sensor 120 is disposed adjacent to at least one driving electrode of the display 110.

Also, according to the above-described embodiment, all conductive patterns (e.g., the driving electrodes TX1 to TX8 and the driving lines TXL1 to TXL8, the sensing electrodes RX1 to RX4 and the sensing lines RXL1 to RXL4, and the noise detection electrode NS) can be disposed on the same layer of the sensor 120. Accordingly, the conductive patterns can be simultaneously formed through the same mask process. Thus, the number of mask processes for manufacturing the touch sensor TS2 can be minimized, reducing the manufacturing cost of the touch sensor TS2 and the display device 1 including the same. Further, as the conductive patterns are disposed on the same layer, the thickness of the touch sensor TS2 and the display device 1 including the same can be reduced.

Figure 7:
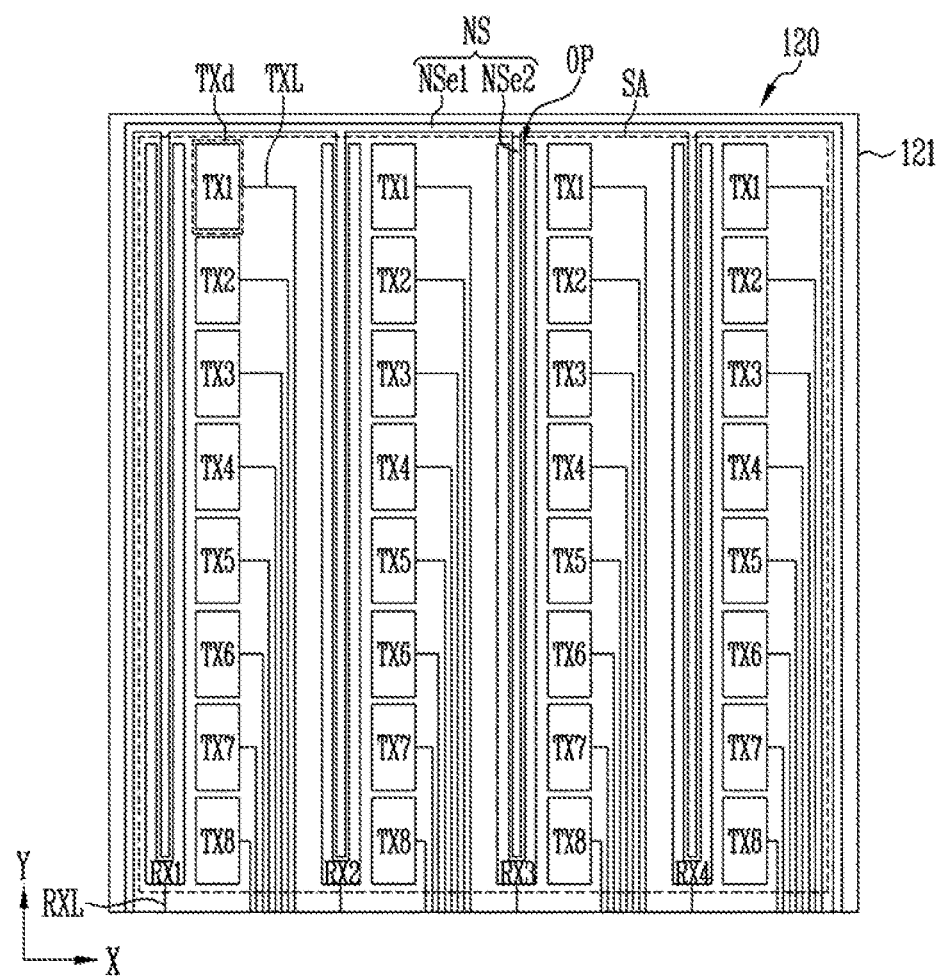
FIG. 7 illustrates another embodiment of a sensor shown in FIG. 4.

FIG. 7 illustrates another embodiment of the sensor shown in FIG. 4. In FIG. 7, components similar or identical to those of the embodiment of FIG. 4 are designated by like reference numeral, and their detailed descriptions will be omitted.

Referring to FIG. 7, at least a central portion of each of the sensing electrodes RX1 to RX4 may be opened. As an example, each of the sensing electrodes RX1 to RX4 may include an opening OP disposed at the inside thereof. Each opening OP may extend along the same direction (i.e., the first direction) as the sensing electrodes RX1 to RX4.

The second electrode part NSe2 of the noise detection electrode NS may be disposed in each opening OP. As an example, the second electrode part NSe2 may branch off into a plurality of parts from the first electrode part NSe1 of the noise detection electrode NS to be located in the opening OP of each of the sensing electrodes RX1 to RX4. Here, the second electrode part NSe2 may be disposed spaced apart at a predetermined distance from each sensing electrode (any one of RX1 to RX4), to enhance electrical stability (e.g., the insulating property) between the sensing electrodes RX1 to RX4 and the noise detection electrode NS.

As described in at least one of the above embodiments, if the noise detection electrode NS (e.g., the second electrode part NSe2) is disposed at the central portion of each sensing electrode (any one of RX1 to RX4) to be surrounded by the sensing electrode, the sensing electrodes RX1 to RX4 are disposed between the driving electrodes TX1 to TX8 and the noise detection electrode NS. Accordingly, a reduced change in noise Sno is detected from the noise detection electrode NS due to the touch driving signal Sdr. Thus, according to the embodiment of FIG. 7, the noise introduced into the sensor 120 is detected with a higher accuracy, with increased noise compensation (or cancellation) efficiency.

FIGS. 8 to 11 illustrate some other embodiments with various modifications to the sensor of FIG. 4. In FIGS. 8 to 11, components similar or identical to those of the embodiment of FIG. 4 are designated by like reference numerals, and their detailed descriptions will be omitted.

Figure 8:
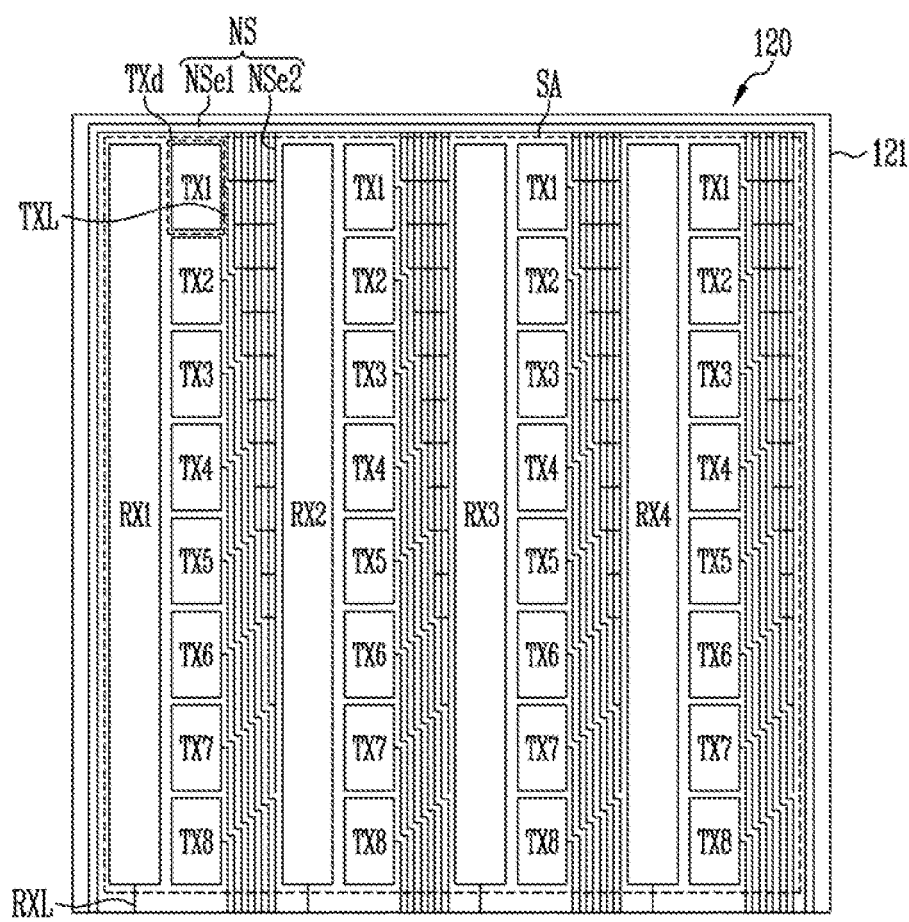
FIGS. 8 to 11 illustrate other embodiments of the sensor shown in FIG. 4.

Referring to FIG. 8, each of driving lines TXL may have a stepped shape in the number corresponding to the position of a driving electrode (any one of TX1 to TX8) coupled thereto. In addition, each second electrode part NSe2 may be disposed in the vicinity of the driving lines TXL while having a stepped shape corresponding to that of the driving lines TXL. For example, each second electrode part NSe2 may be disposed to be spaced apart from driving lines TXL adjacent thereto while having a stepped shape complementary to that of the driving lines TXL. Also, in some embodiments, each second electrode part NSe2 may have a mesh structure in which a plurality of fine lines are combined.

According to the embodiment of FIG. 8, the second electrode part NSe2 of the noise detection electrode NS is disposed in a space secured as each of the driving lines TXL are formed in a stepped shape. Accordingly, the internal space of the sensing region can be effectively used as compared with the embodiment of FIG. 4. For example, in the embodiment of FIG. 8, it is unnecessary to increase the distance between the driving electrodes TX1 to TX8 and the sensing electrodes RX1 to RX4 so as to secure a space for forming the second electrode part NSe2. Accordingly, the magnitude of a mutual capacitance Cse between the driving electrode TX1 to TX8 and the sensing electrodes RX1 to RX4 is sufficiently ensured, so that a touch input can be sensed with high sensitivity.

Figure 9:
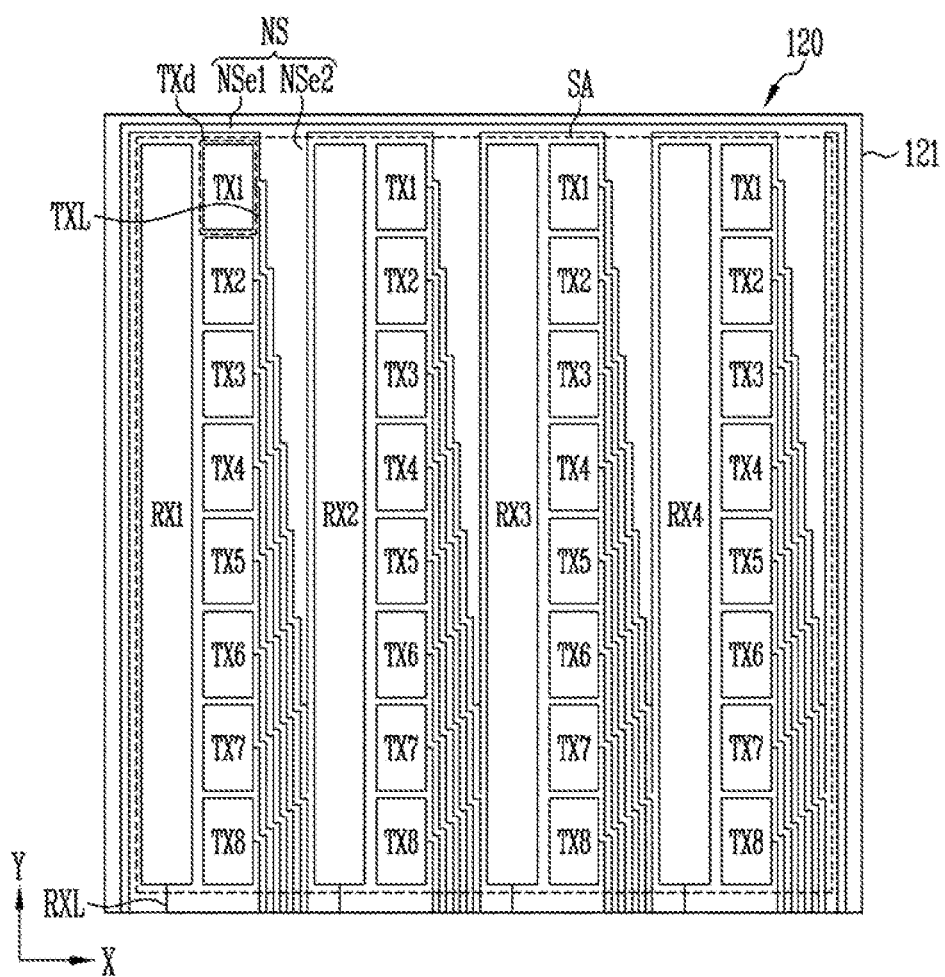

Referring to FIG. 9, each second electrode part NSe2 may have a plate-type structure. Alternatively, in another embodiment, the second electrode part NSe2 may have a complex structure in which the mesh structure and the plate-type structure, which are shown in FIGS. 8 and 9, are combined (e.g., a multi-layered structure in which a plate-type electrode layer and a mesh-type electrode layer are stacked).

According to the embodiment of FIG. 9, the area of the noise detection electrode NS can be increased as compared with the embodiment of FIG. 8. Accordingly, the noise Sno introduced into the sensor 120 can be more effectively detected.

Figure 10:
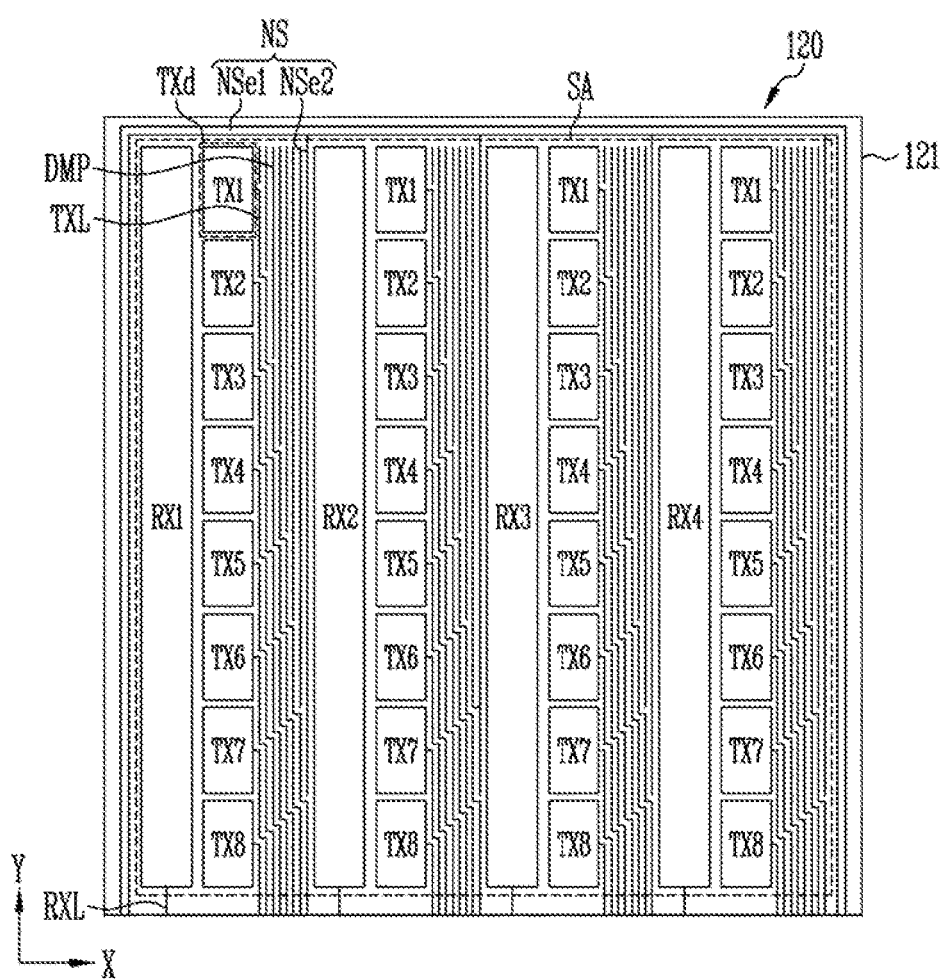

Referring to FIG. 10, the sensor 120 may further include dummy patterns DMP that are disposed adjacent to each second electrode part NSe2, to constitute a step-type pattern part together with the second electrode part NSe2. For example, each second electrode part NSe2 and the dummy patterns DMP adjacent thereto may be disposed in the vicinity of driving lines TXL while having a length gradually changed corresponding to the stepped shape of the driving lines TXL.

In some embodiments, each second electrode part NSe2 may be coupled to a first electrode part NSe1 to constitute the noise detection electrode NS together with the first electrode part NSe1. Each second electrode part NSe2 may be configured with at least one fine line. In addition, each dummy pattern DMP may have a floated individual pattern. As an example, the second electrode part NSe2 and the dummy patterns DMP may be disposed in parallel to be spaced apart from each other while each having a fine line shape (or fine line structure) extending along the first direction. Also, in some embodiments, at least one second electrode part NSe2 may be disposed close to any one of the sensing electrode RX1 to RX4. That is, in some embodiments, the shape and/or structure and position of the second electrode part NSe2 may be variously changed.

According to the embodiment of FIG. 10, a pattern closest to each sensing electrode (any one of RX1 to RX4) among patterns having a fine line shape, which constitute the step-type pattern part adjacent to driving lines TXL of each column, is coupled to the first electrode part NSe1, to be used as the noise detection electrode NS, and the other patterns are floated, to form the dummy patterns DMP. Thus, the separation distance between the driving electrodes TX1 to TX8 and the noise detection electrode NS (particularly, the second electrode part NSe2) can be increased as compared with the embodiment of FIG. 8. Accordingly, a change in noise Sno, which is caused by the touch driving signal Sdr, is minimized, and the noise Sno introduced into the sensor 120 can be more effectively detected.

Figure 11:
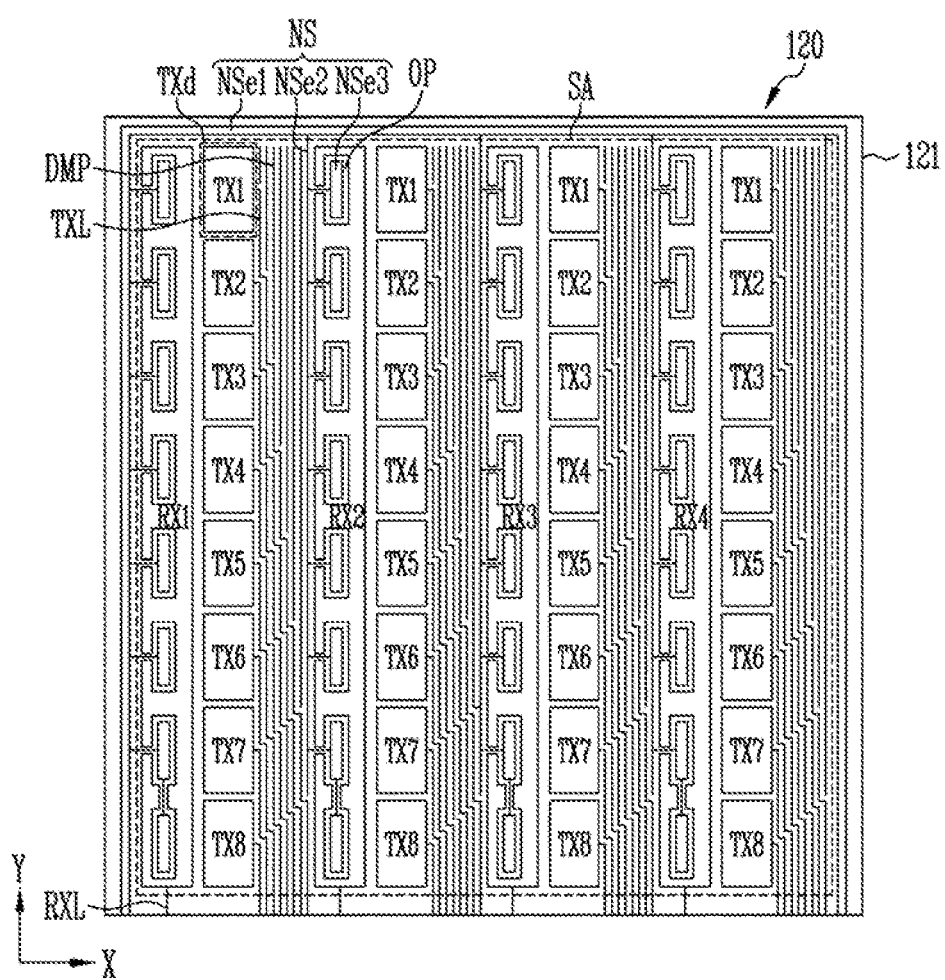

Referring to FIG. 11, each of the sensing electrodes RX1 to RX4 may further include at least one opening OP disposed at the inside thereof. As an example, each of the sensing electrodes RX1 to RX4 may include a plurality of openings OP that are repeated at a certain distance and/or in a certain shape. In addition, the noise detection electrode NS may further include a third electrode part NSe3 that is disposed in the opening OP to be spaced apart from each sensing electrode (any one of RX1 to RX4). In some embodiments, the third electrode part NSe3 may be integrally coupled to the first and second electrode parts NSe1 and NSe2.

Meanwhile, an embodiment in which the third electrode part NSe3 is added to the sensor 120 according to the embodiment of FIG. 10 is illustrated in FIG. 11, but the present disclosure is not limited thereto. For example, in another embodiment of the present disclosure, the third electrode part NSe3 may be added to the sensor 120 according to the embodiment of FIG. 8 or 9.

According to the embodiment of FIG. 11, the area of the noise detection electrode NS can be increased as compared with the embodiment of FIG. 10. Accordingly, the noise Sno introduced into the sensor 120 can be more effectively detected. Also, according to the above-described embodiment, the area of the noise detection electrode NS can be increased at a position closest to the sensing electrodes RX1 to RX4. Accordingly, a noise Sno having a property (e.g., a size and/or a waveform) more similar to that introduced into the sensing electrodes RX1 to RX4 is detected, and noise compensation (cancellation) efficiency can be increased.

Figure 12:
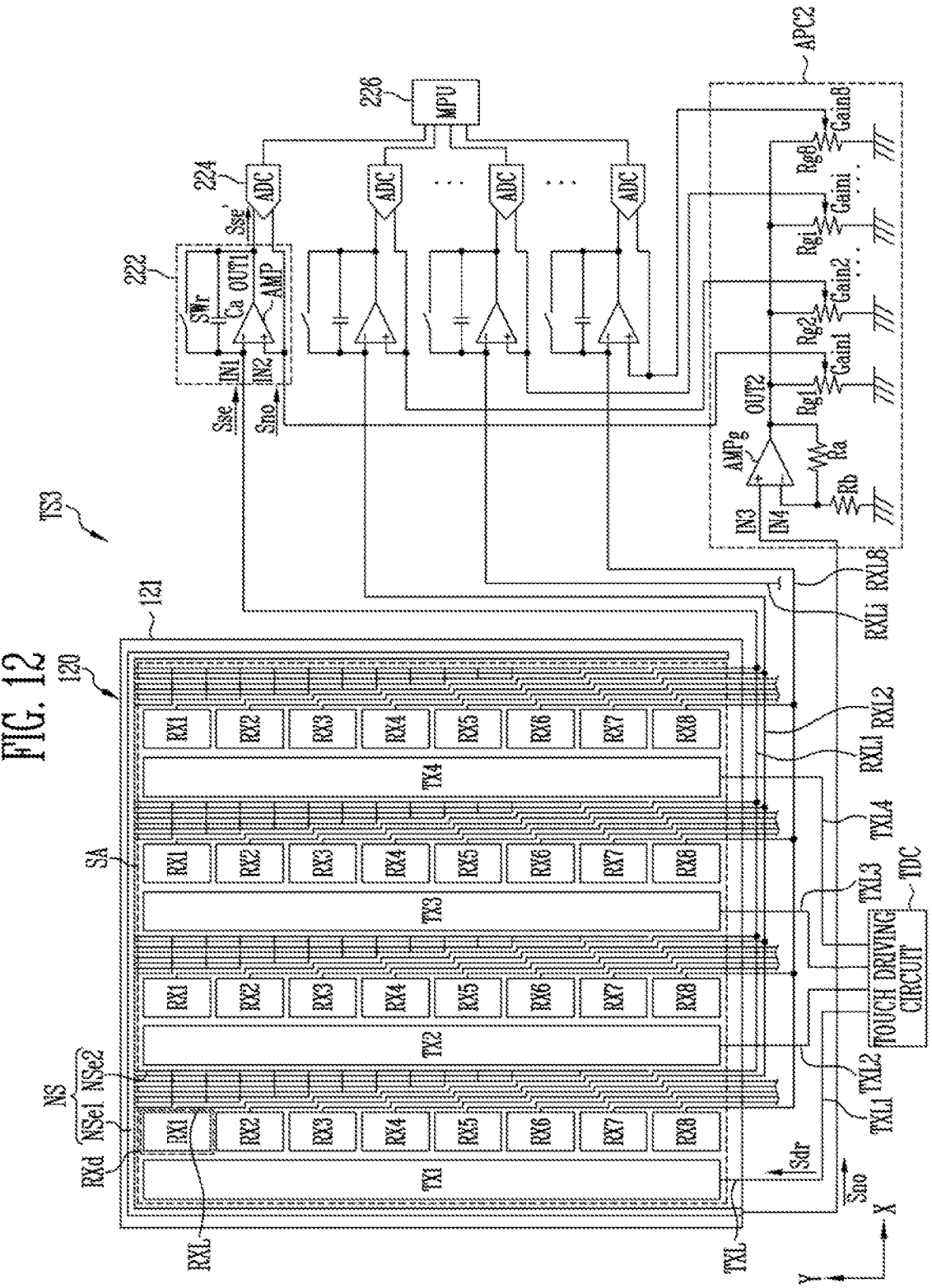
FIG. 12 illustrates a touch sensor according to another embodiment of the present disclosure.

FIG. 12 illustrates a touch sensor according to another embodiment of the present disclosure. In FIG. 12, components similar or identical to the above-described embodiments are designated by like reference numerals, and their detailed descriptions will be omitted.

Referring to FIG. 12, the arrangement structure of driving electrodes TX1 to TX4 and sensing electrodes RX1 to RX8 may be reversely changed, as compared with the embodiments of FIGS. 4 to 11. For example, each of the sensing electrodes RX1 to RX8 may be configured with a plurality of division electrodes RXd that are distributed in a sensing region SA, corresponding to respective coordinate points along a first direction (e.g., a Y direction) and a second direction (e.g., an X direction) intersecting the first direction.

In addition, division electrodes RXd disposed on the same row of the sensing region SA may be electrically coupled to each other by each sensing line (any one of RXL1 to RXL8) at the inside and/or the outside of a sensor 120. As an example, division electrodes RXd disposed on a first row of the sensing region SA may be coupled to each other, to constitute a first sensing electrode RX1. Each of the sensing electrodes RX1 to RX8 may be coupled to a first input terminal IN1 of any one of sensing channels 222.

Meanwhile, each of the driving electrodes TX1 to TX4 may extend along the first direction (e.g., the Y direction) in the sensing region SA. The driving electrodes TX1 to TX4 may be coupled to a touch driving circuit TDC, to be supplied with a touch driving signal Sdr from the touch driving circuit TDC.

According to the above-described embodiment, the total area of the sensing electrodes RX1 to RX8 is decreased as compared with the embodiments shown in FIGS. 4, 8, and the like. Accordingly, a noise introduced into the sensing electrodes RX1 to RX8 from the outside of the sensor 120 (e.g., the display 110) can be reduced.

Also, in the touch sensor TS3 according to this embodiment, each of sensing lines RXL is formed in a stepped shape. As an example, each of the sensing lines RXL may have a stepped shape in the number corresponding to the position of a corresponding sensing electrode (any one of RX1 to RX8). A second electrode part NSe2 of a noise detection electrode NS is disposed in a space secured as each of the sensing lines RXL are formed in the stepped shape. As an example, the second electrode part NSe2 may be disposed in the vicinity of the sensing lines RXL while having a stepped shape corresponding to that of the sensing lines RXL. In some embodiments, the second electrode part NSe2 may have a mesh structure, but the present disclosure is not limited thereto.

According to the above-described embodiment, it is possible to secure a space in which the second electrode part NSe2 is to be disposed without increasing the distance between the driving electrodes TX1 to TX4 and the sensing electrodes RX1 to RX8. Accordingly, a touch input can have increased sensitivity.

Additionally, in the touch sensor TS3 according to this embodiment, an amplifying circuit APC2 may include a plurality of gain resistors (or output resistors) Rg1 to Rg8 coupled in parallel to an output terminal OUT2 of a gain amplifier AMPg. The gain resistors Rg1 to Rg8 may be coupled to different sensing channels among the sensing channels 222. As an example, the amplifying circuit APC2 may include a plurality of gain resistors Rg1 to Rg8 coupled to the respective sensing channels 222. Alternatively, in another embodiment, the amplifying circuit APC2 may include a plurality of gain resistors (e.g., some of Rg1 to Rg8) provided in units of groups each configured with at least two sensing channels 222.

According to the above-described embodiment, resistance values of the gain resistors Rg1 to Rg8 are individually controlled, so that the magnitudes of noises Sn input to the respective sensing channels 222 can be individually controlled. Thus, although noise components in sensing signals Sse transmitted to the respective sensing electrodes RX1 to RX8 may have different degrees (e.g., magnitudes) depending upon the positions of the sensing electrodes RX1 to RX8, the magnitude of a noise Sno input to a second input terminal IN2 for each sensing channel 222 is optimized and controlled, so that the noise component of the sensing signal Sse can be effectively removed or reduced. Accordingly, a touch input can be detected with a higher sensitivity.

Figure 13:
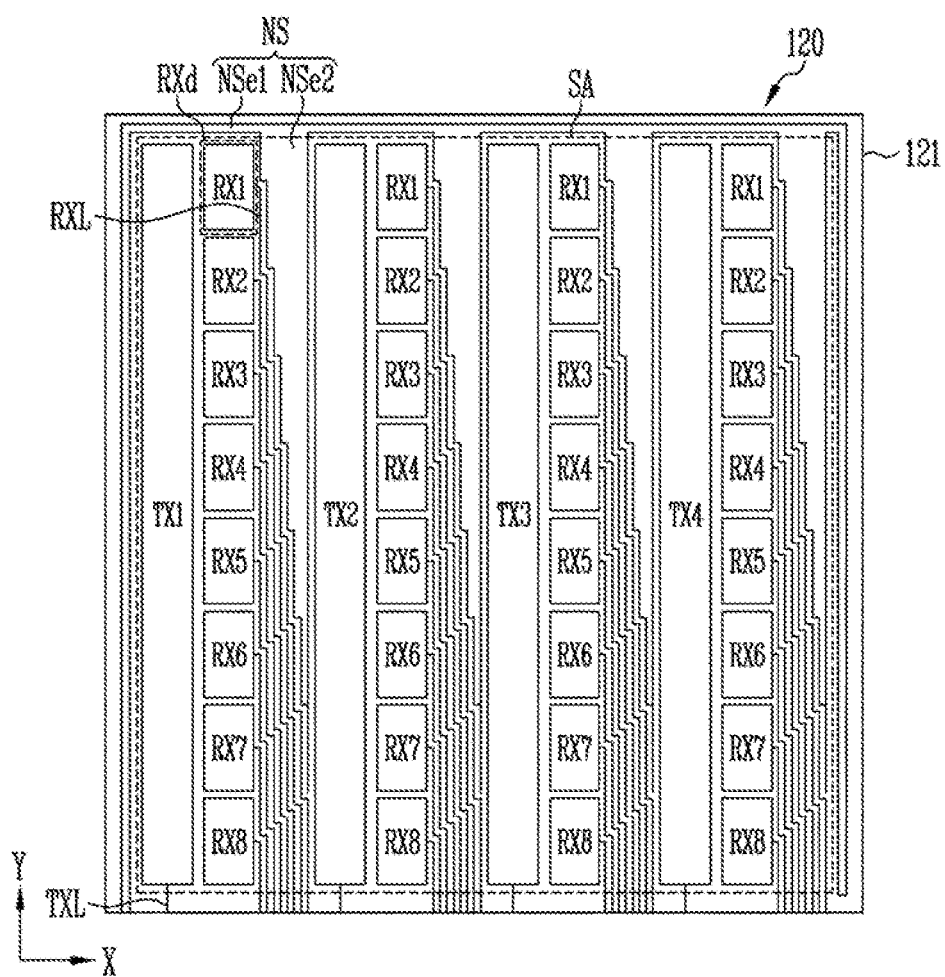
FIGS. 13 and 14 illustrate other embodiments of a sensor shown in FIG. 12.
Figure 14:
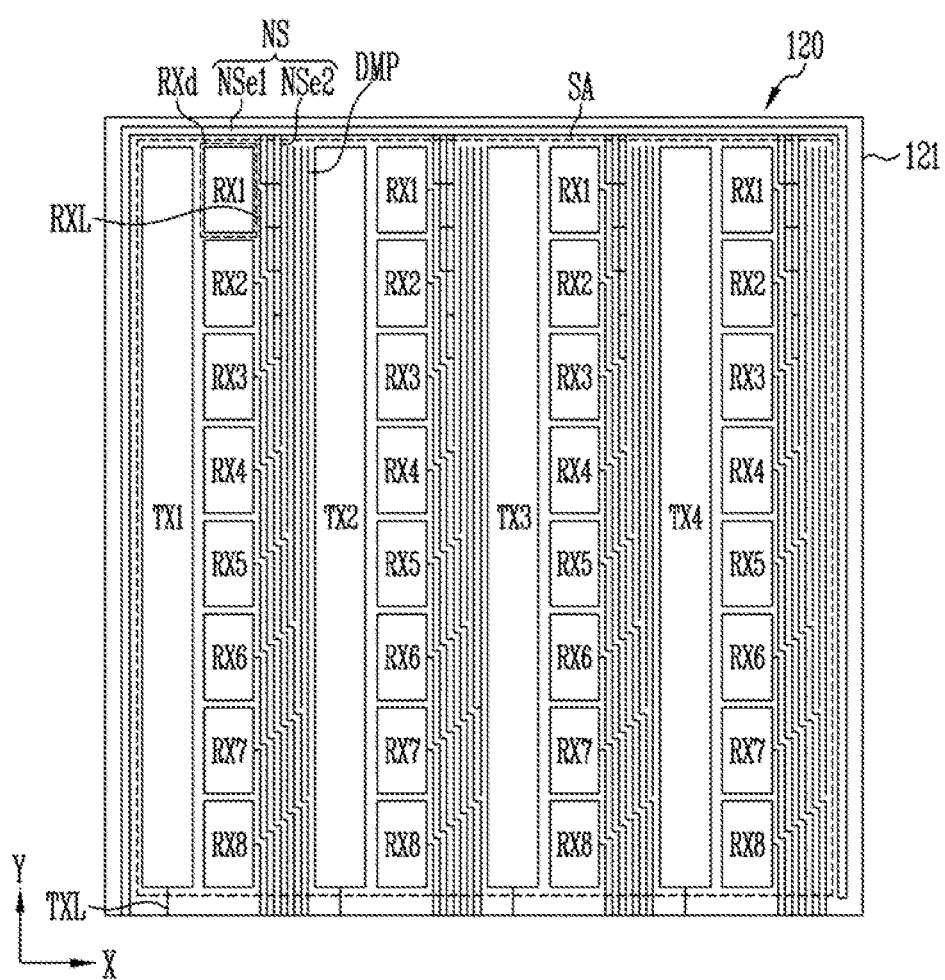

FIGS. 13 and 14 illustrate some other embodiments with various modifications of the sensor of FIG. 12. In FIGS. 13 and 14, components similar or identical to those of the embodiment of FIG. 4 are designated by like reference numerals, and their detailed descriptions will be omitted.

Referring to FIG. 13, each second electrode part NSe2 may have a plate-type structure. Alternatively, in another embodiment, the second electrode part NSe2 may have a complex structure in which the mesh structure and the plate-type structure, which are shown in FIGS. 12 and 13, are combined (e.g., a multi-layered structure in which a plate-type electrode layer and a mesh-type electrode layer are stacked). According to the embodiment of FIG. 13, the area of the noise detection electrode NS is increased as compared with the embodiment of FIG. 12, so that the noise Sno introduced into the sensor 120 can be more effectively detected.

Referring to FIG. 14, the sensor 120 may further include dummy patterns DMP disposed in the vicinity of the sensing lines RXL. In some embodiments, the dummy patterns DMP may be implemented with fine line-shaped floated patterns having a length gradually changed corresponding to the stepped shape of the sensing lines RXL adjacent thereto. In addition, each second electrode part NSe2 constituting the noise detection electrode NS may be configured with at least one fine line disposed in parallel to the dummy patterns DMP. As an example, when each second electrode part NSe2 is configured with a plurality of fine lines, the fine lines may be coupled in a mesh structure. Also, in some embodiments, the dummy patterns DMP may be located between at least one driving electrode (at least one of TX1 to TX4) and the second electrode part NSe2.

According to the embodiment of FIG. 14, the separation distance between the driving electrodes TX1 to TX4 and the noise detection electrode NS (particularly, the second electrode part NSe2) can be increased as compared with the embodiment of FIG. 12. Accordingly, a change in noise Sno caused by the touch driving signal Sdr can be prevented or reduced, and noise compensation (cancellation) efficiency can be increased.

Meanwhile, in addition to the embodiments shown in FIGS. 12 to 14, the structure of the sensor 120 may be variously modified and implemented. As an example, in the sensor 120 according to any one of the embodiments of FIGS. 12 to 14, an opening OP may be formed in the sensing electrodes RX1 to RX8, and a third electrode part NSe3, etc. may be further disposed in the opening OP, as described in the embodiment of FIG. 11.

Figure 15:
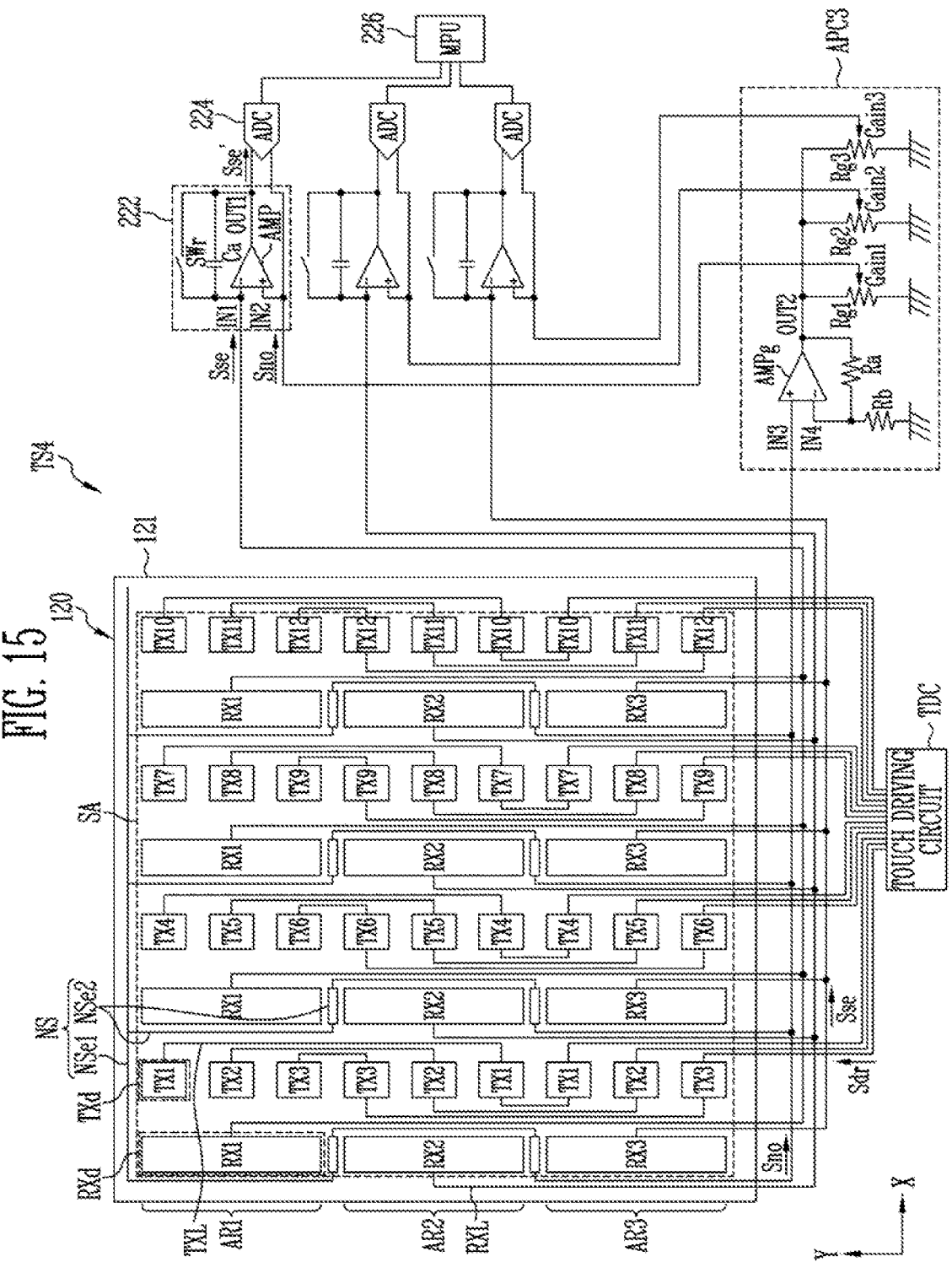
FIG. 15 illustrates a touch sensor according to still another embodiment of the present disclosure.
Figure 16:
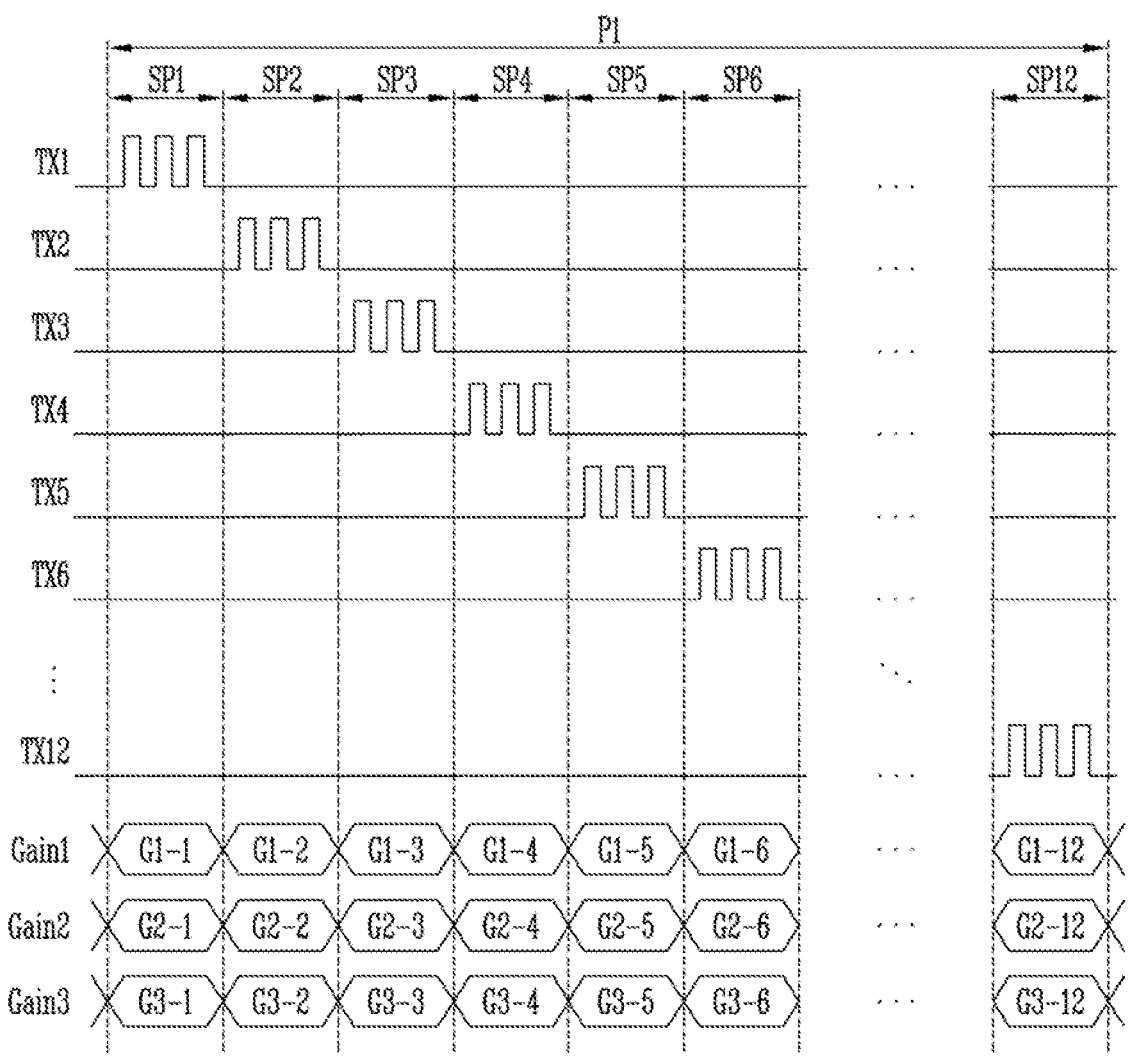
FIG. 16 illustrates an embodiment related to a noise gain control method of the touch sensor shown in FIG. 15.

FIG. 15 illustrates a touch sensor according to still another embodiment of the present disclosure. FIG. 16 illustrates an embodiment related to a noise gain control method of the touch sensor shown in FIG. 15. In FIGS. 15 and 16, components similar or identical to those of the above-described embodiments are designated by like reference numerals, and their detailed descriptions will be omitted.

First, referring to FIG. 15, a sensing region SA may be divided into a plurality of sub-regions AR1 to AR3 along at least a first direction (e.g., a Y direction). As an example, the sensing region SA may be divided into a first sub-region AR1 set as an upper region, a second sub-region AR2 set as a middle region, and a third sub-region AR3 set as a lower region.

In some embodiments, the sensing electrodes RX1 to RX3 may be disposed in units of sub-regions AR1 to AR3. As an example, a first sensing electrode RX1 may be disposed in the first sub-region AR1, a second sensing electrode RX2 may be disposed in the second sub-region AR2, and a third sensing electrode RX3 may be disposed in the third sub-region AR3. In addition, each of the sensing electrodes RX1 to RX3 may be divided into a plurality of first division electrodes RXd along a second direction (e.g., an X direction) to be disposed in a corresponding sub-region (any one of AR1 to AR3). That is, in some embodiments, the sensing electrodes RX1 to RX3 may be disposed in different sub-regions AR1 to AR3, and each of the sensing electrodes RX1 to RX3 may be configured with a plurality of first division electrodes RXd that are distributed in a corresponding sub-region.

Each of driving electrodes TX1 to TX12 may be configured with a plurality of second division electrodes TXd, of which at least one is disposed for every sub-region (any one of AR1 to AR3). In addition, the second division electrodes TXd may be coupled in the form of a linked chain. For example, each second division electrode TXd may constitute each driving electrode (any one of TX1 to TX12) while being coupled to at least one second division electrode TXd disposed in another sub-region (e.g., the other sub-regions except a sub-region in which the second division electrode TXd is disposed) to form a pair. As described above, when a linked chain structure is applied to the sensing region SA divided into a plurality of sub-regions AR1 to AR3, the number of lines (e.g., driving lines TXL and sensing lines RXL) extracted from the sensor 120 can be decreased, and a relatively high resolution can be realized.

In the touch sensor TS4 to which the above-described embodiment is applied, the positions of the sub-regions AR1 to AR3 may be defined by the sensing electrodes RX1 to RX3, and the detailed positions of the sub-regions AR1 to AR3 may be defined by the driving electrodes TX1 to TX12 in each of the sub-regions AR1 to AR3. Accordingly, when a touch input occurs, it is possible to detect a point (or coordinate) at which the touch input occurs. Meanwhile, in another embodiment of the present disclosure, the arrangement structure of the driving electrodes TX1 to TX12 and the sensing electrodes RX1 to RX3, which are shown in FIG. 15) may be reversely changed. However, in this case, the principle of detecting a point at which a touch input occurs is substantially identical, and therefore, its detailed description will be omitted.

Also, the touch sensor TS4 according to this embodiment includes a noise detection electrode for detecting a noise Sno and differentially compensating for the noise Sno. In some embodiments, the noise detection electrode NS may include a first electrode part Nse1 disposed at the outside of the sensing region SA and a second electrode part NSe2 extending to the inside of the sensing region SA from the first electrode part NSe1.

In some embodiments, the second electrode part NSe2 may be disposed adjacent to the sensing electrodes RX1 to RX3. For example, the second electrode part NSe2 may pass through a region between adjacent first division electrodes (e.g., first division electrodes of the first to second sub-regions AR1 and AR2) among the first division electrodes RXd.

Additionally, the touch sensor TS4 according to this embodiment may include an amplifying circuit APC3 coupled between the noise detection electrode NS and sensing channels 222. In some embodiments, the amplifying circuit APC3 may include a gain amplifier AMPg coupled between the noise detection electrode NS and the sensing channels 222, and a plurality of gain resistors Rg1 to Rg3 coupled in parallel to an output terminal OUT2 of the gain amplifier AMPg. As an example, the amplifying circuit APC3 may include first to third gain resistors Rg1 to Rg3 coupled between first, second, and third sensing channels 222 respectively coupled to the first, second, and third sensing electrodes RX1, RX2, and RX3 and the gain amplifier AMPg. Accordingly, the amplification gain of a noise Sno can be independently controlled for each sub-region (any one of AR1 to AR3) in which each sensing electrode (any one of RX1 to RX3) is disposed.

In addition, as shown in FIG. 16, a gain value G1-1 to G3-12 of the amplifying circuit APC3 may be changed for every at least one sub-period among sub-periods SP1 to SP12 in which a touch driving signal Sdr is supplied to each driving electrode (any one of TX1 to TX12) such that noise cancellation can be maximized.

According to the above-described embodiment, the magnitude of the noise Sno input to the sensing channels 222 can be independently controlled for each position (or coordinate) of the sensor 120. Accordingly, a noise component included in a sensing signal Sse can be more effectively removed.

Figure 17:
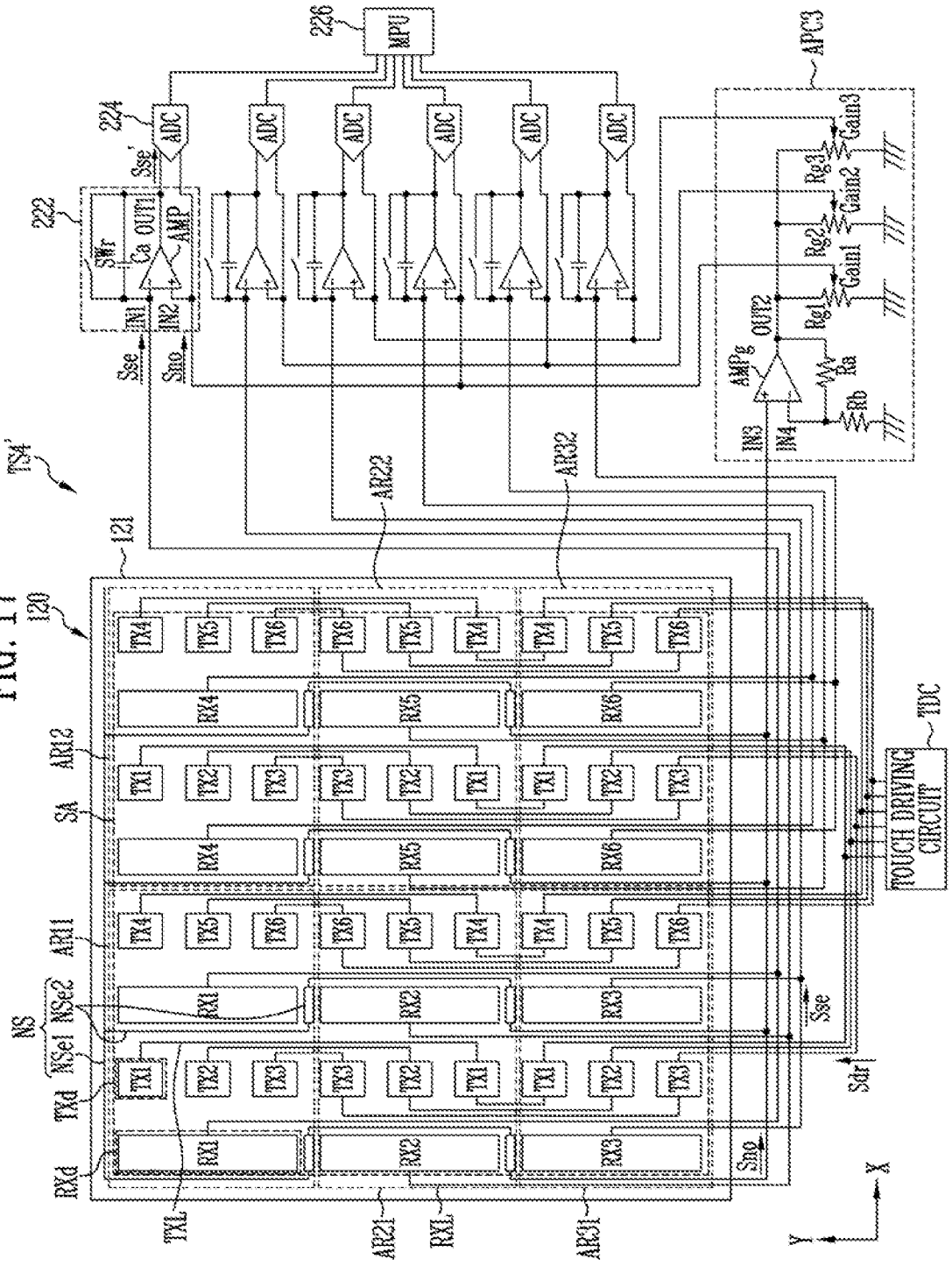
FIG. 17 illustrates a modification of the touch sensor of FIG. 15.
Figure 18:
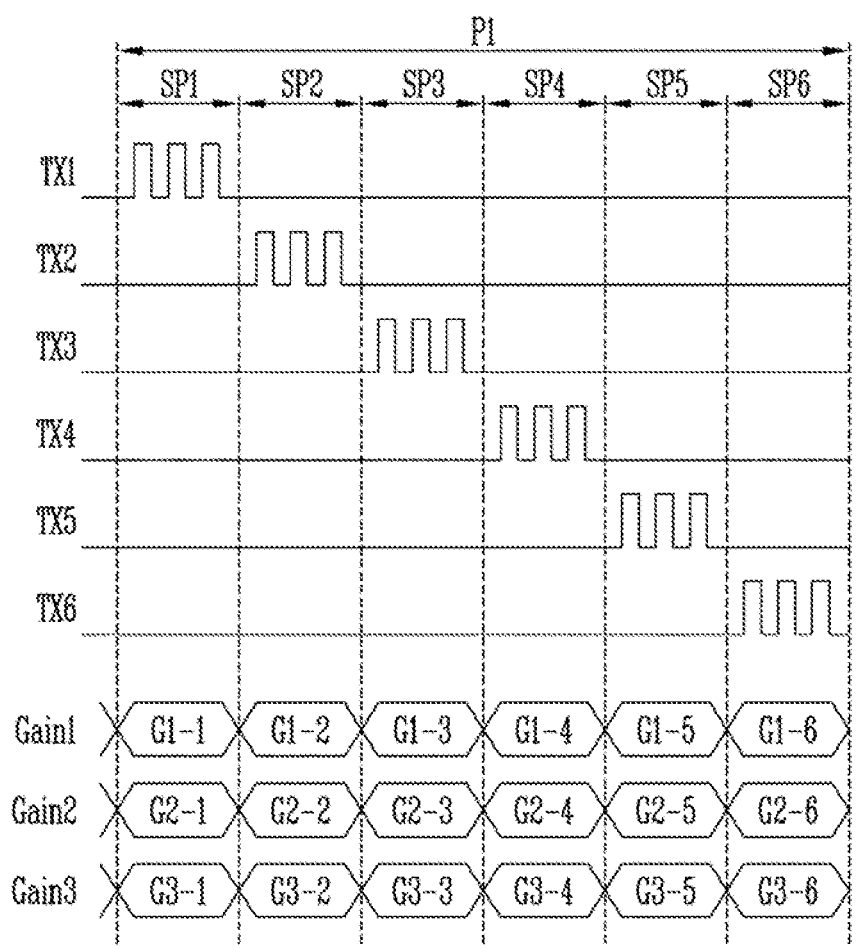
FIG. 18 illustrates an embodiment related to a noise gain control method of the touch sensor shown in FIG. 17.

FIG. 17 illustrates a modification of the touch sensor of FIG. 15. FIG. 18 illustrates an embodiment related to a noise gain control method of the touch sensor shown in FIG. 17. In FIGS. 17 and 18, components similar or identical to those of the above-described embodiments are designated by like reference numerals, and their detailed descriptions will be omitted.

First, referring to FIG. 17, a sensing region SA may be divided into a plurality of sub-regions ARij (i and j are natural numbers) along a first direction (e.g., a Y direction) and a second direction (e.g., an X direction). As an example, the sensing region SA may be divided into an eleventh sub-region AR11 set as a left upper region, a twenty-first sub-region AR21 set as a left middle region, a thirty-first region AR31 set as a left lower region, a twelfth region AR12 set as a right upper region, a twenty-second region AR22 set as a right middle region, and a thirty-second region AR32 set as a right lower region.

In addition, different sensing electrodes RX1 to RX6 may be disposed in units of sub-regions ARij. As an example, a first sensing electrode RX1 may be disposed in the eleventh sub-region AR11, a second sensing electrode RX2 may be disposed in the twenty-first region AR21, a third sensing electrode RX3 may be disposed in the thirty-first sub-region AR3, a fourth sensing electrode RX4 may be disposed in the twelfth sub-region AR12, a fifth sensing electrode RX5 may be disposed in the twenty-second sub-region AR22, and a sixth sensing electrode RX6 may be disposed in the thirty-second sub-region AR32. In some embodiments, each of the sensing electrodes RX1 to RX6 may be configured with a plurality of first division electrodes RXd distributed along the first direction and/or the second direction in a corresponding sub-region ARij.

Meanwhile, each of the driving electrodes TX1 to TX6 may be configured with a plurality of second division electrodes TXd, of which at least one is disposed in each of the sub-regions ARij. In addition, the second division electrodes TXd may be coupled in the form of a linked chain. Accordingly, the number of lines (e.g., driving lines TXL and sensing lines RXL) extracted from the sensor 120 can be decreased, and a relatively high resolution can be realized.

Meanwhile, in the touch sensor TS4' according to this embodiment, each of gain resistors Rg1 to Rg3 of an amplifying circuit APC3 may be coupled to a plurality of sensing channels 222. As an example, a first gain resistor Rg1 may be coupled to two sensing channels 222 respectively coupled to the first and fourth sensing electrodes RX1 and RX4. In addition, a second gain resistor Rg2 may be coupled to two sensing channels 222 respectively coupled to the second and fifth sensing electrodes RX2 and RX5, and a third gain resistor Rg3 may be coupled to two sensing channels 222 respectively coupled to the third and sixth sensing electrodes RX3 and RX6.

In addition, as shown in FIG. 18, a gain value G1-1 to G3-6 of the amplifying circuit APC3 may be changed for every at least one sub-period among sub-periods SP1 to SP6 in which a touch driving signal Sdr is supplied to each driving electrode (any one of TX1 to TX6) such that noise cancellation can be maximized. Accordingly, a noise component included in a sensing signal Sse can be more effectively removed.

FIGS. 19 to 22 illustrate other embodiments of the sensor shown in FIG. 15. FIGS. 19 to 22 illustrate different modifications of the sensor of FIG. 15. In FIGS. 19 to 22, components similar or identical to those of the above-described embodiments are designated by like reference numerals, and their detailed descriptions will be omitted.

Figure 19:
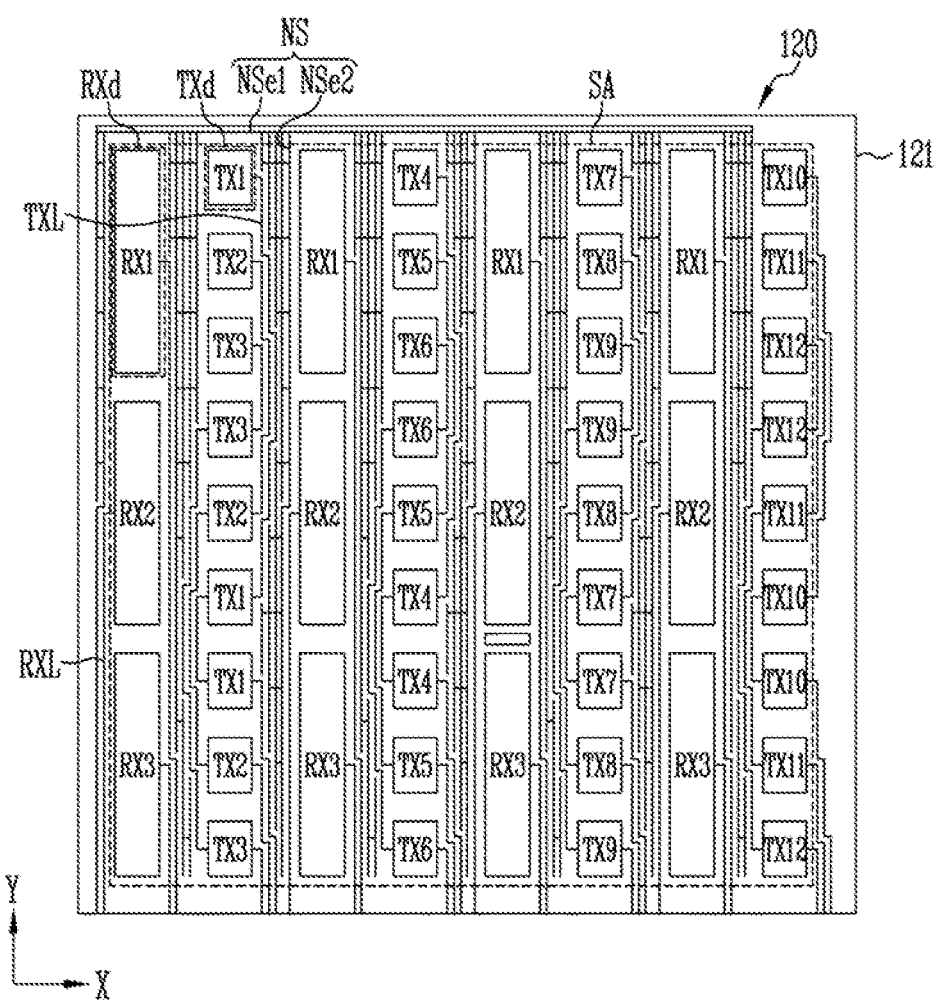
FIGS. 19 to 22 illustrate other embodiments of a sensor shown in FIG. 15.

Referring to FIG. 19, at least some of the sensing lines RXL and the driving lines TXL may have a stepped shape. In addition, the second electrode part NSe2 of the noise detection electrode NS may have a mesh structure.

In some embodiments, the noise detection electrode NS may include a plurality of second electrode parts NSe2 branching off into a plurality of parts from the first electrode part NSe1. In addition, each second electrode part NSe2 may be disposed between adjacent first and second division electrodes RXd and TXd or in the vicinity of at least one first division electrode RXd.

Figure 20:
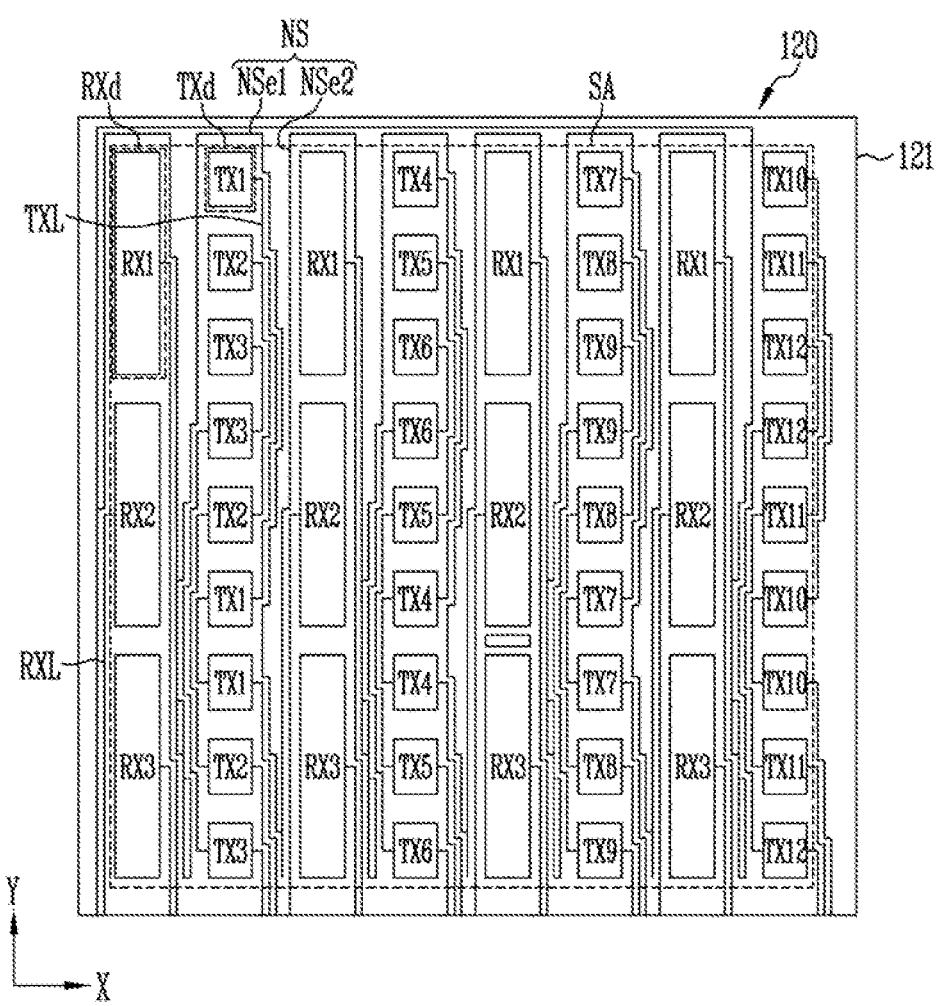

Referring to FIG. 20, each second electrode part NSe2 may have a plate-type structure. Alternatively, in another embodiment, the second electrode part NSe2 may have a fine line structure, a mesh structure, a plate-type structure, or a complex structure in which at least two structures among the structures are combined.

Figure 21:
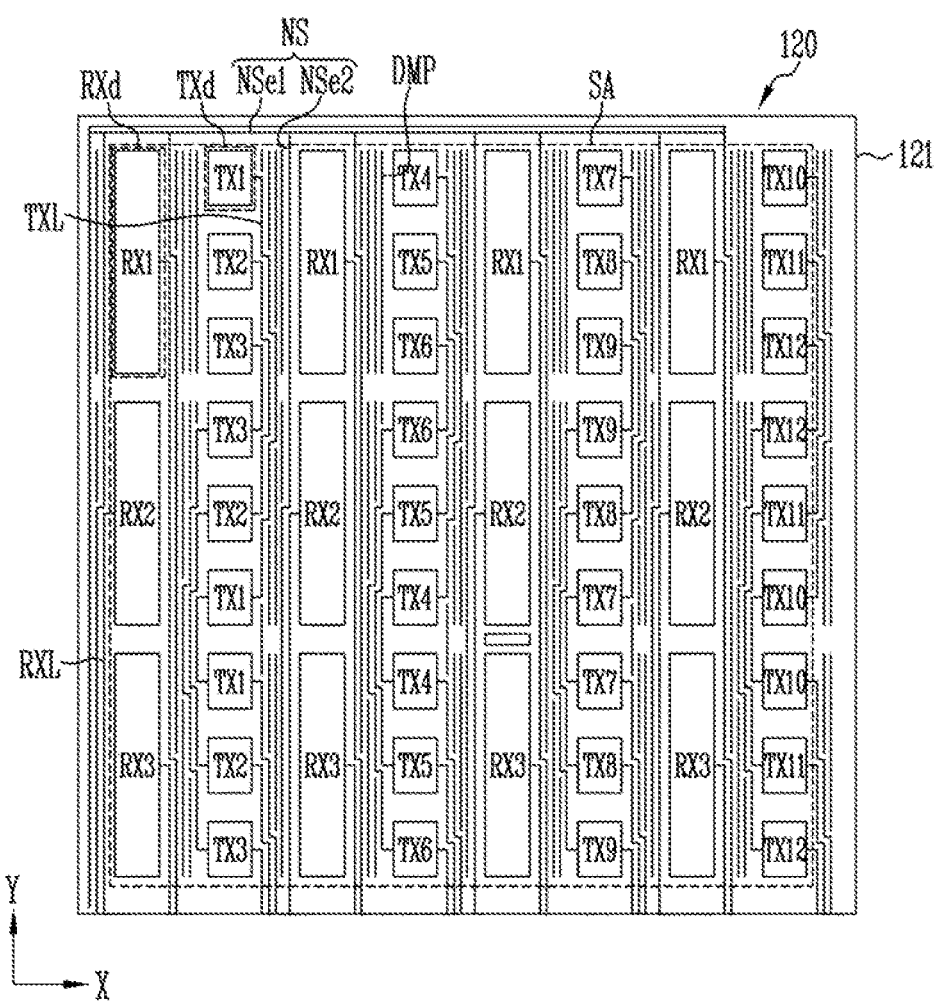

Referring to FIG. 21, each second electrode part NSe2 may be configured with at least one fine line adjacent to at least one sensing electrode (any one of RX1 to RX3) (or at least one first division electrode RXd). In addition, the sensor 120 may further include dummy patterns DMP. In some embodiments, the dummy patterns DMP may be disposed between at least one second electrode part NSe2 and at least one driving electrode (any one of TX1 to TX12) (or at least one second division electrode TXd) and/or in the vicinity of at least one second electrode part NSe2.

Figure 22:
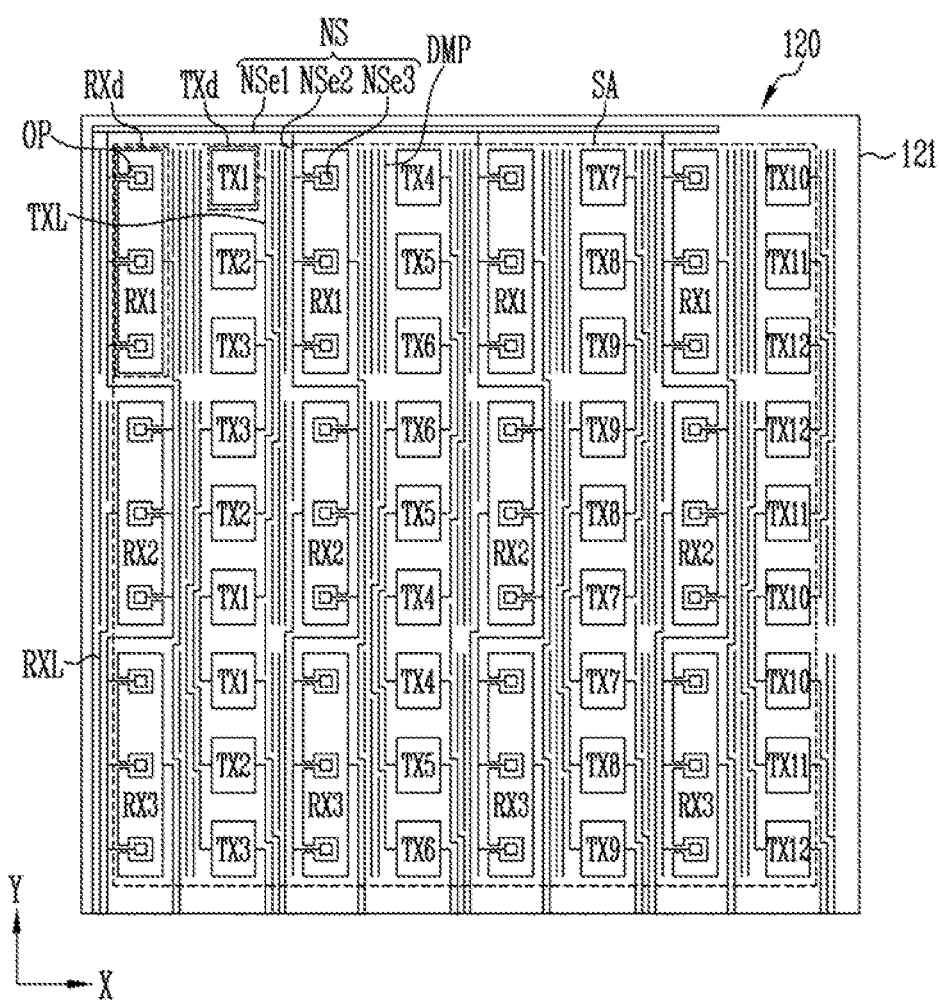

Referring to FIG. 22, each of the sensing electrodes RX1 to RX3 (or the first division electrodes RXd) may include at least one opening OP disposed at the inside thereof. In addition, the noise detection electrode NS may further include a third electrode part NSe3 disposed in the opening OP of each of the sensing electrodes RX1 to RX3. In some embodiments, the first to third electrode parts NSe1 to NSe3 of the noise detection electrode NS may be integrally coupled to each other.

Figure 23:
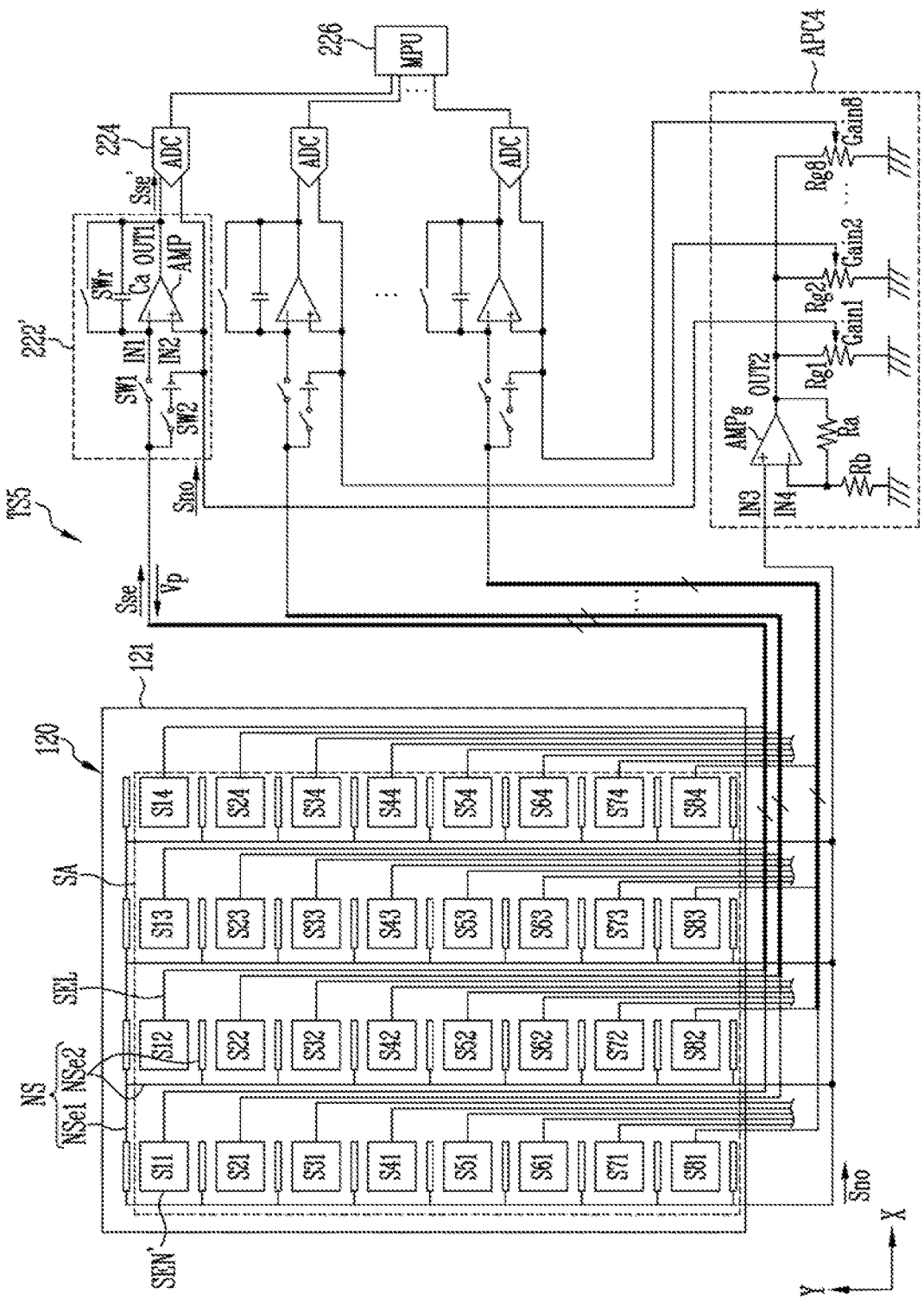
FIG. 23 illustrates a touch sensor according to still another embodiment of the present disclosure.

FIG. 23 illustrates a touch sensor according to still another embodiment of the present disclosure. In FIG. 23, components similar or identical to those of the above-described embodiments are designated by like reference numerals, and their detailed descriptions will be omitted.

Referring to FIG. 23, the touch sensor TS5 according to the embodiment of the present disclosure may be implemented as a touch sensor using a self-capacitance method. As an example, in the display device 1 shown in FIG. 1, the structure and driving method of the sensor 120 and the sensor driver 220 may be changed.

In some embodiments, sensor electrodes (or sensing electrodes) SEN' distributed in a matrix form may be disposed in a sensing region SA of the sensor 120. As an example, the sensor electrodes SEN' may be distributed at coordinate points along first and second directions (e.g., XY directions) intersecting each other to be spaced apart from each other. Each of the sensor electrodes SEN' may be coupled to any one sensing channel 222' through each sensor line (or sensing line) SEL. Meanwhile, for convenience, one sensing channel 222' among sensing channels 222' coupled to a plurality of sensor electrodes SEN', e.g., sensor electrodes S11 to S14 disposed on a first row is representatively illustrated in FIG. 23. However, like a general structure using a dot-type self-capacitance method currently known in the art, the sensor electrodes SEN' may be coupled different sensing channels 222' through different sensor lines SEL.

In addition, the touch sensor TS5 according to this embodiment includes a noise detection electrode NS for detecting a noise Sno and differentially compensating for the noise Sno. In some embodiments, the noise detection electrode NS may include a first electrode part NSe1 disposed at the outside of the sensing region SA and a second electrode part NSe2 extending to the inside of the sensing region SA from the first electrode part NSe1.

In some embodiments, the second electrode part NSe2 may be disposed adjacent to the sensor electrodes SEN'. For example, the second electrode part NSe2 may extend along the first direction (e.g., the Y direction) for every column on which the sensor electrodes SEN' are disposed to be disposed in parallel to the sensor electrodes SEN'. Also, each second electrode part NSe2 may branch off into a plurality of parts to pass between adjacent sensor electrodes SEN'.

Meanwhile, each sensing channel 222' may include an amplifier AMP, a first switch SW1 coupled between a first input terminal IN1 of the amplifier AMP and any one of the sensor electrodes SEN', and a second switch SW2 coupled between a second input terminal 1N2 of the amplifier AMP and the noise detection electrode NS. The first and second switches SW1 and SW2 are alternately turned on during a touch sensing period in which the touch sensor TS5 is activated. If the second switches SW2 of the sensing channels 222' are turned on, a predetermined voltage (e.g., a precharge voltage) Vp is transferred to the sensor electrodes SEN'. Accordingly, the sensor electrodes SEN' are charged with the voltage. Meanwhile, if the first switches SW1 of the sensing channels 222' are turned on, sensing signals Sse are input to the sensing channels 222' from the sensor electrodes SEN', respectively.

In the above-described embodiment, reference potential terminals (i.e., second input terminals IN2) of the sensing channels 222' and reference potential terminals of ADCs 224 may be coupled to the noise detection electrode NS. Thus, a noise component of the sensing signal Sse can be removed or reduced in the sensor driver 220 by a differential compensation method using the noise Sno detected from the noise detection electrode NS.

Additionally, the touch sensor TS5 may further include an amplifying circuit APC4 coupled between the noise detection electrode NS and the sensing channels 222'. In some embodiments, the amplifying circuit APC4 may include a gain amplifier AMPg and gain resistors Rg1 to Rg8. The gain amplifier AMPg may be coupled between the noise detection electrode NS and the sensing channels 222'. In addition, each of the gain resistors Rg1 to Rg8 may be coupled to at least one sensing channel 222'. As an example, the second input terminals IN2 of sensing channels 222' coupled to sensor electrodes Si1 to Si4 of an ith row may be commonly coupled to any one gain resistor Rgi among the gain resistors Rg1 to Rg8. Accordingly, the amplification gain of the noise Sno can be differentially controlled along the first direction (e.g., the Y direction).

FIGS. 24 to 27 illustrate other embodiments of the sensor shown in FIG. 23. FIGS. 24 to 27 illustrate different modifications of the sensor of FIG. 23. In FIGS. 24 to 27, components similar or identical to those of the above-described embodiments are designated by like reference numerals, and their detailed descriptions will be omitted.

Figure 24:
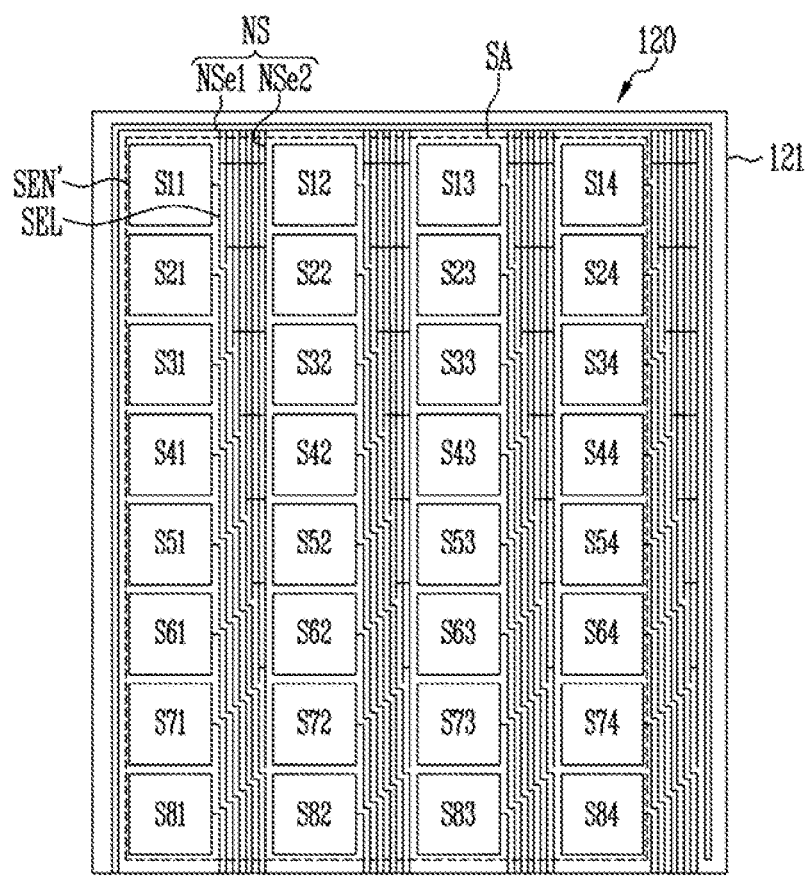
FIGS. 24 to 27 illustrate other embodiments of a sensor shown in FIG. 23.

Referring to FIG. 24, each sensor line SEL may have a stepped shape in the number corresponding to the position of a sensor electrode SEN' coupled thereto. In addition, the second electrode part NSe2 of the noise detection electrode NS may have a stepped shape corresponding to that of the sensor lines SEL. As an example, each second electrode part NSe2 may have a stepped shape complementary to that of sensor lines SEL adjacent thereto. Also, each second electrode part NSe2 may be implemented in a mesh structure configured with a plurality of fine lines.

Figure 25:
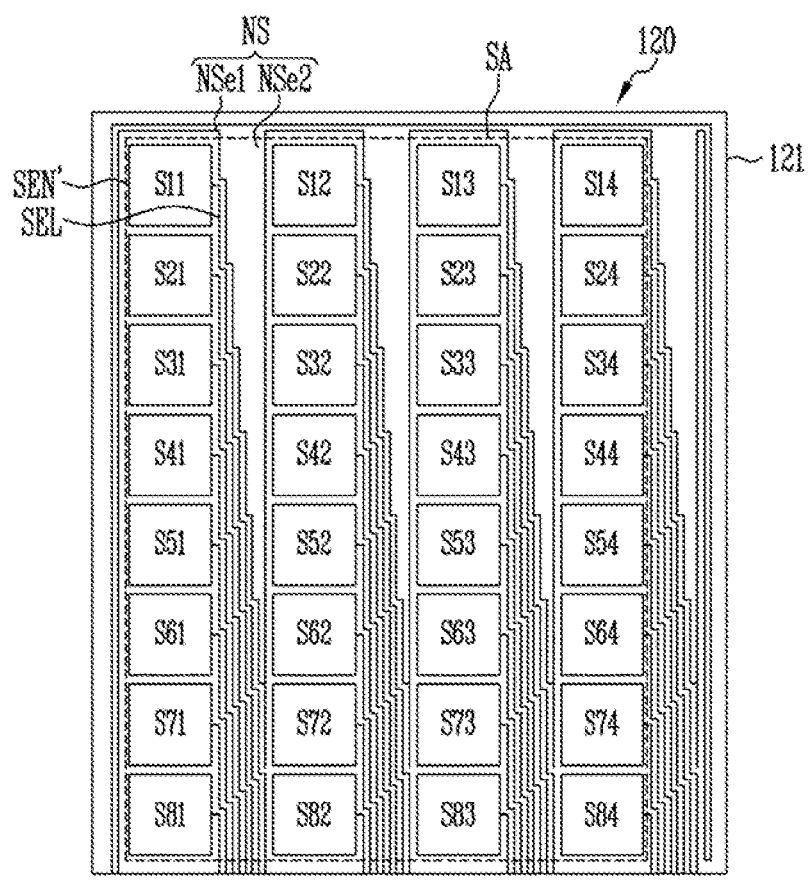

Referring to FIG. 25, each second electrode part NSe2 may have a plate-type structure. Alternatively, in another embodiment, the second electrode part NSe2 may have a fine line structure, a mesh structure, a plate-type structure, or a complex structure in which at least two structures among the structures are combined.

Figure 26:
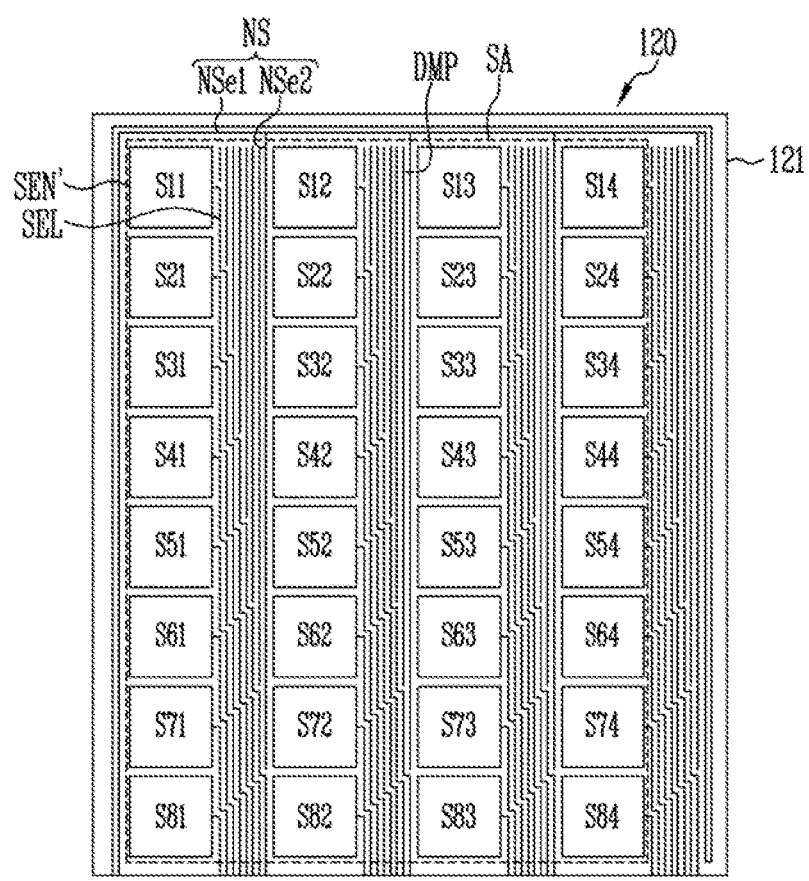

Referring to FIG. 26, each second electrode part NSe2 may be implemented with at least one linear line, and floated dummy patterns DMP may be disposed between the second electrode part NSe2 and the sensor electrodes SEN'.

Figure 27:
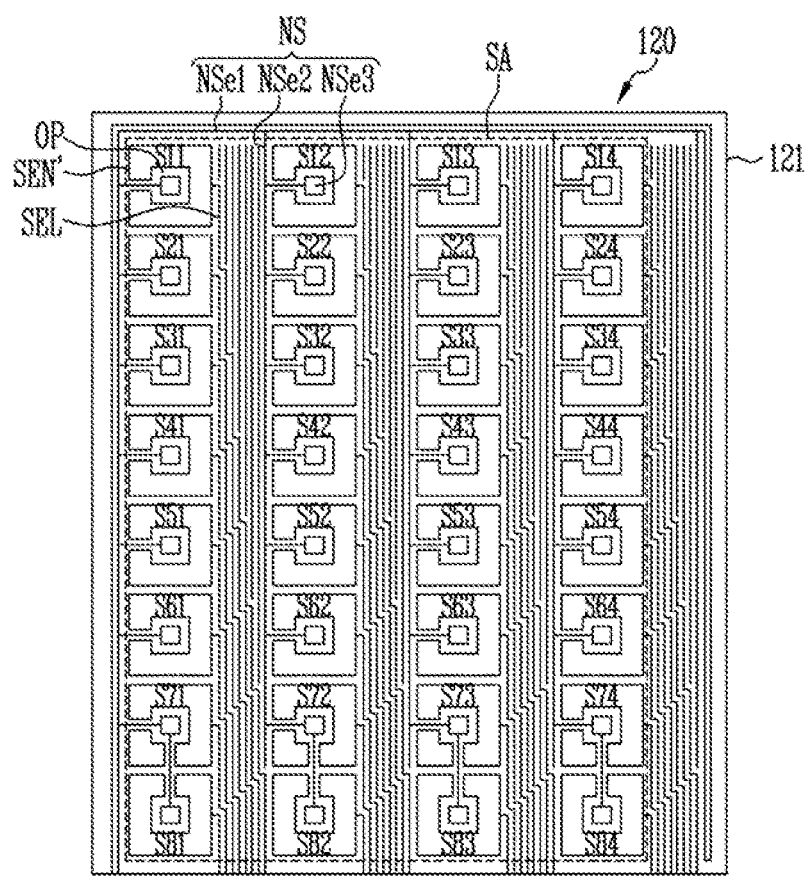

Referring to FIG. 27, each of the sensor electrodes SEN' may include at least one opening OP disposed at the inside thereof. In addition, the noise detection electrode NS may further include a third electrode part NSe3 disposed in the opening OP of each of the sensor electrodes SEN'. In some embodiments, the first to third electrode parts NSe1 to NSe3 of the noise detection electrode NS may be integrally coupled to each other.

Figure 28A:
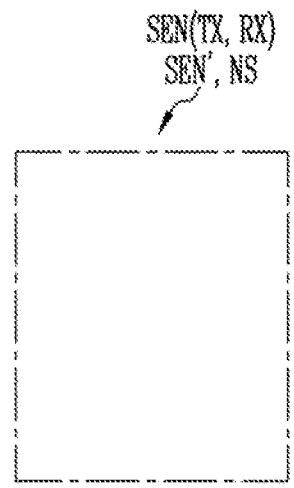
FIGS. 28A to 28C illustrate different embodiments related to the structure of sensor electrodes and a noise detection electrode.
Figure 28B:
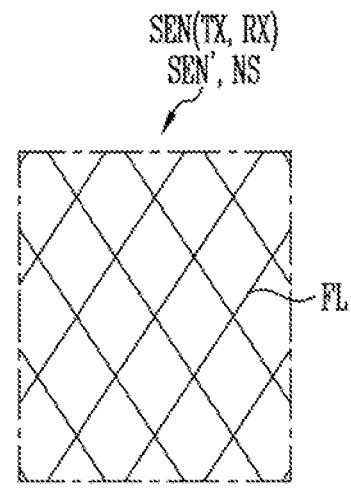
Figure 28C:
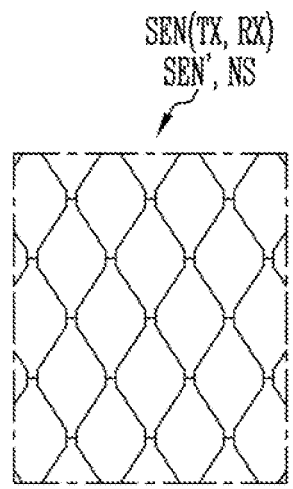

FIGS. 28A to 28C illustrate different embodiments related to the structure of the sensor electrodes and the noise detection electrode.

Referring to FIG. 28A, each of the sensor electrodes SEN and SEN' and/or the noise detection electrode NS may have a plate-type structure. As an example, each of the sensor electrodes SEN and SEN' and/or the noise detection electrode NS may be implemented as an individual plate-type electrode configured with at least one transparent conductive layer.

Referring to FIGS. 28B and 28C, each of the sensor electrodes SEN and SEN' and/or the noise detection electrode NS may have a mesh-type structure, and the shape of a mesh may be variously modified. As an example, each of the sensor electrodes SEN and SEN' and/or the noise detection electrode NS may be implemented as a mesh-type electrode configured with a metal fine lines FL having low-resistance characteristics.

Also, in some embodiments, each of the sensor electrodes SEN and SEN' and/or the noise detection electrode NS may have a structure in which the plate-type structure and the mesh-type structure are combined. As an example, each of the sensor electrodes SEN and SEN' and/or the noise detection electrode NS may be implemented as an electrode having a multi-layered structure that includes at least one transparent conductive layer and at least one mesh-type electrode disposed on the top or bottom of the transparent conductive layer.

In the touch sensor and the display device including the same according to the present disclosure, a noise is detected as the noise detection electrode is configured in the sensor, and a noise component of a sensing signal is removed using the detected noise. Accordingly, a malfunction of the touch sensor due to a noise may be prevented, and a touch input may be sensed with high sensitivity.

Further, in the touch sensor and the display device including the same according to the present disclosure, both of the sensor electrodes and the noise detection electrode are disposed on the same layer of the sensor. Accordingly, the manufacturing cost of the touch sensor and the display device may be reduced by minimizing the number of mask processes, and the thickness of the touch sensor and the display device may be minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
pixels arranged in a display region;
sensing electrodes arranged in a sensing region at least partially overlapping with the display region;
sensing lines coupled to the respective sensing electrodes;
a noise detection electrode disposed on the same layer as the sensing electrodes; and
sensing channels each including a first input terminal coupled to any one of the sensing electrodes and a second input terminal coupled to the noise detection electrode, each of the sensing channels generating an output signal corresponding to a voltage difference between the first and second input terminals; and
driving electrodes arranged in the sensing region,
wherein the noise detection electrode includes a first electrode part,
wherein the sensing region is defined by two opposite parts of the first electrode part and another part connecting the two opposite parts, and
wherein the sensing electrodes and the driving electrodes are disposed in the sensing region defined by the two opposite parts and another part of the first electrode part.

2. The display device of claim 1, wherein the sensing lines are disposed on the same layer as the sensing electrodes and the noise detection electrode.

3. The display device of claim 2, wherein each of the sensing lines is integrally coupled to any one of the sensing electrodes in a sensor in which the sensing electrodes are arranged.

4. The display device of claim 1, further comprising:
driving lines coupled to the driving electrodes,
wherein the driving electrodes are disposed on the same layer as the sensing electrodes and the noise detection electrode.

5. The display device of claim 4, wherein each of the driving lines is integrally coupled to any one of the driving electrodes in a sensor in which the driving electrodes and the sensing electrodes are arranged.

6. The display device of claim 4, wherein each of the sensing electrodes extends along a first direction in the sensing region, and
each of the driving electrodes is configured with a plurality of division electrodes distributed in the sensing region, corresponding to predetermined coordinate points along the first direction and a second direction intersecting the first direction.

7. The display device of claim 6, wherein the noise detection electrode further includes:
a second electrode part extending to the inside of the sensing region from the first electrode part.

8. The display device of claim 7, wherein the second electrode part extends along the first direction in parallel with at least one sensing electrode among the sensing electrodes.

9. The display device of claim 7, wherein each of the sensing electrodes includes an opening disposed at the inside thereof,
wherein the second electrode part of the noise detection electrode branches off into a plurality of parts from the first electrode part, with the plurality of parts being located in the opening of each of the sensing electrodes.

10. The display device of claim 7, wherein the driving lines have a stepped shape in a number corresponding to a position of a corresponding driving electrode.

11. The display device of claim 10, wherein the second electrode part of the noise detection electrode is disposed proximal to the driving lines while having a stepped shape corresponding to that of the driving lines.

12. The display device of claim 11, wherein the second electrode part has a fine line structure, a mesh structure, a plate-type structure, or any combination thereof.

13. The display device of claim 10, further comprising dummy patterns disposed proximal to the driving lines while having a length gradually changed corresponding to the stepped shape of the driving lines.

14. The display device of claim 13, wherein the second electrode part of the noise detection electrode is disposed in parallel to the dummy patterns disposed adjacent to the dummy patterns.

15. The display device of claim 7, wherein each of the sensing electrodes includes at least one opening disposed at the inside thereof,
wherein the noise detection electrode further includes a third electrode part disposed in the opening of each of the sensing electrodes.

16. The display device of claim 6, further comprising an amplifying circuit coupled between the noise detection electrode and the sensing channels.

17. The display device of claim 16, wherein a gain value of the amplifying circuit is changed for every at least one sub-period among a plurality of sub-periods in which each of the driving electrodes is driven.

18. The display device of claim 4, wherein each of the driving electrodes extends along a first direction in the sensing region, and
each of the sensing electrodes is configured with a plurality of division electrodes distributed in the sensing region, corresponding to predetermined coordinate points along the first direction and a second direction intersecting the first direction.

19. The display device of claim 18, wherein the noise detection electrode further includes:
a second electrode part extending to the inside of the sensing region from the first electrode part.

20. The display device of claim 19, wherein the sensing lines have a stepped shape in a number corresponding to a position of a corresponding sensing electrode, and
wherein the second electrode part of the noise detection electrode is disposed in a vicinity of the sensing lines while having a stepped shape corresponding to that of the sensing lines.

21. The display device of claim 20, wherein the second electrode part has a mesh structure, a plate-type structure, or a complex structure in which the mesh structure and the plate-type structure are combined.

22. The display device of claim 19, further comprising dummy patterns disposed proximal to the sensing lines while having a length gradually changed corresponding to a stepped shape of the sensing lines.

23. The display device of claim 22, wherein the second electrode part of the noise detection electrode is configured with at least one fine line disposed in parallel to the dummy patterns.

24. The display device of claim 18, further comprising an amplifying circuit coupled between the noise detection electrode and the sensing channels.

25. The display device of claim 24, wherein the amplifying circuit includes:
a gain amplifier coupled between the noise detection electrode and the sensing channels; and
a plurality of resistors coupled in parallel to an output terminal of the gain amplifier, the plurality of resistors being coupled to different sensing channels among the sensing channels.

26. The display device of claim 4, wherein the sensing region is divided into a plurality of sub-regions along at least one of first and second directions intersecting each other, and
wherein the sensing electrodes are divided and disposed in different sub-regions, and each of the sensing electrodes is configured with a plurality of first division electrodes distributed in a corresponding sub-region.

27. The display device of claim 26, wherein each of the driving electrodes is configured to a plurality of second division electrodes, of which at least one is disposed in each of the sub-regions.

28. The display device of claim 27,
wherein the noise detection electrode further includes:
a second electrode part extending to the inside of the sensing region from the first electrode part.

29. The display device of claim 28,
wherein the second electrode part passes through a region between adjacent first division electrodes among the first division electrodes.

30. The display device of claim 28, wherein the second electrode part is disposed between adjacent first and second division electrodes, and has a fine line structure, a mesh structure, a plate-type structure, or a complex structure in which at least two structures among the structures are combined.

31. The display device of claim 28, further comprising dummy patterns disposed between at least one of the driving electrodes and the second electrode part.

32. The display device of claim 28, wherein each of the sensing electrodes includes at least one opening disposed at the inside thereof,
wherein the noise detection electrode further includes a third electrode part disposed in the opening of each of the sensing electrodes.

33. The display device of claim 26, further comprising an amplifying circuit coupled between the noise detection electrode and the sensing channels.

34. The display device of claim 33, wherein the amplifying circuit includes:
a gain amplifier coupled between the noise detection electrode and the sensing channels; and
a plurality of resistors coupled in parallel to an output terminal of the gain amplifier, the plurality of resistors being coupled to at least one sensing channel among the sensing channels.

35. The display device of claim 33, wherein a gain value of the amplifying circuit is changed for every at least one sub-period among a plurality of sub-periods in which each of the driving electrodes is driven.

36. The display device of claim 1, wherein the sensing region overlaps with the display region.

37. A display device comprising:
pixels arranged in a display region;
sensing electrodes arranged in a sensing region at least partially overlapping with the display region;
sensing lines coupled to the respective sensing electrodes;
a noise detection electrode disposed on the same layer as the sensing electrodes; and
sensing channels each including a first input terminal coupled to any one of the sensing electrodes and a second input terminal coupled to the noise detection electrode, each of the sensing channels generating an output signal corresponding to a voltage difference between the first and second input terminals; and
an amplifying circuit coupled between the noise detection electrode and the sensing channels,
wherein the amplifying circuit includes:
a gain amplifier coupled between the noise detection electrode and the sensing channels; and
a plurality of resistors coupled in parallel to an output terminal of the gain amplifier, the plurality of resistors being coupled to at least one sensing channel among the sensing channels, and
wherein the sensing electrodes are distributed at respective coordinate points along first and second directions intersecting each other, and are coupled to different sensing channels among the sensing channels.

38. The display device of claim 37, wherein the noise detection electrode includes:
a first electrode part disposed at the outside of the sensing region; and a second electrode part extending to the inside of the sensing region from the first electrode part to pass between adjacent sensing electrodes.

39. The display device of claim 38, wherein the second electrode part has a fine line structure, a mesh structure, a plate-type structure, or a complex structure in which at least two structures among the structures are combined.

40. The display device of claim 38, further comprising dummy patterns disposed between the second electrode part and the sensing electrodes.

41. The display device of claim 38, wherein each of the sensing electrodes includes at least one opening disposed at the inside thereof,
wherein the noise detection electrode further includes a third electrode part disposed in the opening of each of the sensing electrodes.

42. The display device of claim 37, wherein, among the sensing channels, a plurality of sensing channels corresponding to sensing electrodes disposed on the same row of the sensing region are commonly coupled to any one of the resistors of the amplifying circuit.

43. A display device comprising:
pixels arranged in a display region;
sensor electrodes distributed in a sensing region;
sensor lines coupled to the respective sensor electrodes;
a noise detection electrode disposed at a periphery of the sensor electrodes;
dummy patterns disposed between the sensor electrodes and the noise detection electrode;
sensing channels each including a first input terminal coupled to at least one of the sensor electrodes and a second input terminal coupled to the noise detection electrode, the sensing channels each generating an output signal corresponding to a voltage difference between the first and second input terminals; and
a processor detecting a touch input, using the output signals of the sensing channels,
wherein the sensor lines have a stepped shape in a number corresponding to a position of each sensor electrode, and
wherein the dummy patterns are disposed proximal to the sensor lines while having a length gradually changed corresponding to the stepped shape of the sensor lines.

44. The display device of claim 43, wherein the noise detection electrode includes:
a first electrode part disposed at the outside of the sensing region; and
a second electrode part extending to the inside of the sensing region from the first electrode part, the second electrode part having a stepped shape corresponding to that of the sensor lines.

45. The display device of claim 43, wherein the sensor electrodes, the sensor lines, and the noise detection electrode are disposed on the same layer.

* * * * *